(12) United States Patent
Mizuno et al.

(10) Patent No.: US 12,352,651 B2
(45) Date of Patent: Jul. 8, 2025

(54) EYEGLASSES LENS MEASUREMENT DEVICE AND NON-TRANSITORY COMPUTER-READABLE STORAGE MEDIUM

(71) Applicant: NIDEK CO., LTD., Gamagori (JP)

(72) Inventors: Katsuyasu Mizuno, Aichi (JP); Toshihiro Kobayashi, Aichi (JP); Yujiro Tochikubo, Aichi (JP); Yuichi Matsubara, Aichi (JP)

(73) Assignee: NIDEK CO., LTD., Aichi (JP)

( * ) Notice: Subject to any disclaimer, the term of this patent is extended or adjusted under 35 U.S.C. 154(b) by 99 days.

(21) Appl. No.: 17/788,946

(22) PCT Filed: Dec. 18, 2020

(86) PCT No.: PCT/JP2020/047535
§ 371 (c)(1),
(2) Date: Jun. 24, 2022

(87) PCT Pub. No.: WO2021/132101
PCT Pub. Date: Jul. 1, 2021

(65) Prior Publication Data
US 2023/0034573 A1 Feb. 2, 2023

(30) Foreign Application Priority Data

Dec. 26, 2019 (JP) .................................. 2019-237367
Dec. 26, 2019 (JP) .................................. 2019-237368

(51) Int. Cl.
*G01M 11/02* (2006.01)
(52) U.S. Cl.
CPC .... *G01M 11/0207* (2013.01); *G01M 11/0264* (2013.01)

(58) Field of Classification Search
CPC ......... G01M 11/0207; G01M 11/0264; G01M 11/0278; G01M 11/0235
See application file for complete search history.

(56) References Cited

U.S. PATENT DOCUMENTS 3,880,525 A * 4/1975 Johnson ............. G01M 11/0235
356/127
5,175,594 A * 12/1992 Campbell .......... G01M 11/0235
356/127

(Continued)

FOREIGN PATENT DOCUMENTS

| CN | 105699052 A | 6/2016 |
|---|---|---|
| CN | 109556834 A | 4/2019 |

(Continued)

OTHER PUBLICATIONS

Extended European Search Report issued Dec. 22, 2023 by the European Patent Office in European Patent Application No. 20906583.8.

(Continued)

*Primary Examiner* — Mohamed K Amara
(74) *Attorney, Agent, or Firm* — Sughrue Mion, PLLC

(57) ABSTRACT

An eyeglasses lens measurement device measures an eyeglasses lens of eyeglasses. The eyeglasses lens measurement device includes a light source that emits a measurement light flux toward the eyeglasses lens, a transmissive display that transmits the measurement light flux from the light source and displays an index pattern formed by arranging a plurality of indexes, a detector that detects the measurement light flux passing through the eyeglasses lens and the transmissive display, and a controller. The controller is configured to control a display of the index pattern, acquire an optical characteristic of the eyeglasses lens, based on a detection result of the detector, and acquire lens information different (Continued)

from the optical characteristic of the eyeglasses lens, based on a detection result of the detector.

18 Claims, 13 Drawing Sheets

(56) References Cited

U.S. PATENT DOCUMENTS

| | | | |
|---|---|---|---|
| 5,734,465 A * | 3/1998 | Kajino | G01M 11/025 356/124 |
| 5,847,819 A * | 12/1998 | Yanagi | G01M 11/0228 356/124 |
| 5,872,625 A * | 2/1999 | Kajino | G01M 11/0235 356/127 |
| 5,910,836 A * | 6/1999 | Ikezawa | G01M 11/0235 356/127 |
| 5,971,537 A * | 10/1999 | Fukuma | G01M 11/0207 351/44 |
| 5,973,772 A * | 10/1999 | Fukuma | G02C 13/005 356/124 |
| 6,061,123 A * | 5/2000 | Ikezawa | G01M 11/0235 356/127 |
| 6,236,453 B1 * | 5/2001 | Ikezawa | G01M 11/0235 356/127 |
| 6,496,253 B1 * | 12/2002 | Vokhmin | G01B 11/2513 356/124 |
| 6,657,710 B2 | 12/2003 | Kajino et al. | |
| 7,728,962 B2 * | 6/2010 | Hornauer | G01M 11/0207 356/124 |
| 10,036,685 B2 * | 7/2018 | Goldberg | G01M 11/0264 |
| 10,330,566 B2 * | 6/2019 | Hofmann | G01M 11/0264 |
| 2002/0085196 A1 * | 7/2002 | Fukuma | G01M 11/0207 356/124 |
| 2002/0113940 A1 * | 8/2002 | Fukuma | G06Q 30/0621 351/200 |
| 2003/0030789 A1 | 2/2003 | Kajino et al. | |
| 2006/0152709 A1 | 7/2006 | Imaizumi | |
| 2011/0013137 A1 * | 1/2011 | Kitani | G02C 7/061 351/159.42 |
| 2013/0293726 A1 | 11/2013 | Armstrong-Muntner et al. | |
| 2016/0124221 A1 * | 5/2016 | Huang | G01J 1/42 359/239 |
| 2016/0363506 A1 * | 12/2016 | Escalier | G01M 11/0278 |
| 2017/0336284 A1 | 11/2017 | Goldberg et al. | |
| 2018/0106700 A1 * | 4/2018 | Limon | G02C 13/003 |
| 2018/0275014 A1 * | 9/2018 | Kobayashi | G01M 11/0235 |
| 2018/0306670 A1 | 10/2018 | Goldberg et al. | |
| 2019/0049335 A1 | 2/2019 | Goldberg et al. | |
| 2019/0094106 A1 | 3/2019 | Saika | |
| 2019/0128825 A1 * | 5/2019 | Zhong | G03F 9/7026 |
| 2020/0041378 A1 * | 2/2020 | Drew | G01M 11/0235 |
| 2020/0088603 A1 * | 3/2020 | Glasenapp | G02C 13/003 |
| 2020/0124496 A1 | 4/2020 | Goldberg et al. | |
| 2021/0033489 A1 * | 2/2021 | Glasenapp | A61B 3/1035 |
| 2022/0034751 A1 * | 2/2022 | Tan | G02B 27/62 |
| 2022/0178787 A1 * | 6/2022 | Mohamed | G01M 11/0278 |
| 2022/0187160 A1 * | 6/2022 | Bai | G02B 5/205 |
| 2023/0034573 A1 * | 2/2023 | Mizuno | G01M 11/0278 |

FOREIGN PATENT DOCUMENTS

| | | |
|---|---|---|
| EP | 3 290 892 A1 | 3/2018 |
| JP | 7-140046 A | 6/1995 |
| JP | 2006-189386 A | 7/2006 |
| JP | 2006-292687 A | 10/2006 |
| JP | 2009-229422 A | 10/2009 |
| JP | 2012-93348 A | 5/2012 |
| JP | 3186077 U | 9/2013 |
| JP | 2015-184184 A | 10/2015 |
| JP | 2016-45140 A | 4/2016 |
| JP | 2018-36255 A | 3/2018 |
| JP | 2018-54454 A | 4/2018 |
| JP | 2019-15541 A | 1/2019 |
| JP | 2019-522781 A | 8/2019 |

OTHER PUBLICATIONS

International Search Report dated Mar. 16, 2021 issued by the International Searching Authority in counterpart International Application No. PCT/JP2020/047535 (PCT/ISA/210).
International Written Opinion dated Mar. 16, 2021 issued by the International Searching Authority in counterpart International Application No. PCT/JP2020/047535 (PCT/ISA/237).
Communication dated Apr. 16, 2024, issued by the Japanese Patent Office in Japanese Application No. 2019-237368.
Office Action issued on Mar. 29, 2025 by the Chinese Patent Office in corresponding CN Patent Application No. 202080089974.5.

* cited by examiner

EYEGLASSES LENS MEASUREMENT DEVICE AND NON-TRANSITORY COMPUTER-READABLE STORAGE MEDIUM

CROSS-REFERENCE TO RELATED APPLICATIONS

This application is a National Stage of International Application No. PCT/JP2020/047535 filed Dec. 18, 2020, claiming priority based on Japanese Patent Application No. 2019-237367, filed Dec. 26, 2019, and Japanese Patent Application No. 2019-237368, filed Dec. 26, 2019, the contents of all of which are incorporated herein by reference in their entirety.

TECHNICAL FIELD

The present disclosure relates to an eyeglasses lens measurement device and a non-transitory computer-readable storage medium storing an eyeglasses lens measurement program for measuring an optical characteristic of an eyeglasses lens.

BACKGROUND ART

As an eyeglasses lens measurement device, a device including an optical system for measuring an optical characteristic of an eyeglasses lens and an optical system for detecting lens information (hidden mark) of the eyeglasses lens is known (see, for example, Patent Literature 1).

Further, as an eyeglasses lens measurement device, a lens meter is known in which a measurement light flux is projected onto an eyeglasses lens and the measurement light flux passing through the eyeglasses lens and an index plate is detected by a detector (see, for example, Patent Literature 2). As the measurement light flux passes through the index plate, an image of an index pattern formed by a plurality of indexes is projected onto the eyeglasses lens.

CITATION LIST

Patent Literature

Patent Literature 1: JP-A-2018-54454
Patent Literature 2: JP-A-2012-93348

SUMMARY OF INVENTION

As a first problem, in Patent Literature 1, the optical system for obtaining the optical characteristic of the eyeglasses lens, and the optical system for obtaining the lens information of the eyeglasses lens are provided individually, and thus, there is a problem that the configuration of the device is complicated. Further, it is difficult to align the eyeglasses lens with each optical system, and thus, there is a problem that it is difficult to easily acquire the optical characteristic and the lens information of the eyeglasses lens.

As a second problem, in Patent Literature 2, since the eyeglasses lens has various refraction powers, it may be difficult to appropriately detect an index pattern image projected onto the eyeglasses lens, depending on the eyeglasses lens. As an example, it may be difficult to detect the index pattern image due to overlapping images of a plurality of indexes or spreading images of the plurality of indexes. In such a state, the optical characteristic of the eyeglasses lens cannot be accurately obtained.

In view of the above-mentioned prior art, a technical object of the present disclosure is to provide an eyeglasses lens measurement device capable of accurately acquiring the optical characteristic and the lens information of the eyeglasses lens with a simple configuration.

An eyeglasses lens measurement device according to a first aspect of the present disclosure is an eyeglasses lens measurement device that measures an eyeglasses lens, the eyeglasses lens measurement device including:
  a light source that emits a measurement light flux toward the eyeglasses lens;
  a transmissive display that transmits the measurement light flux from the light source, and displays an index pattern formed by arranging a plurality of indexes;
  a detector that detects the measurement light flux passing through the eyeglasses lens and the transmissive display; and
  a controller configured to:
    control a display of the index pattern;
    acquire an optical characteristic of the eyeglasses lens, based on a detection result of the detector; and
    acquire lens information different from the optical characteristic of the eyeglasses lens, based on a detection result of the detector, in which the controller causes the transmissive display to display the index pattern to acquire the optical characteristic, and the controller causes the transmissive display not to display at least a part of the index pattern to acquire the lens information.

An eyeglasses lens measurement device according to a second aspect of the present disclosure is an eyeglasses lens measurement device that measures an optical characteristic of an eyeglasses lens, the eyeglasses lens measurement device including:
  a transmissive display that transmits a measurement light flux from a light source, and displays an index pattern formed by arranging a plurality of indexes; and
  a controller configured to:
    control a display of the index pattern; and
    set an interval of the plurality of indexes,
  in which the optical characteristic of the eyeglasses lens is acquired based on the measurement light flux passing through the eyeglasses lens and the transmissive display.

A non-transitory computer readable recording medium storing an eyeglasses lens measurement program according to a third aspect of the present disclosure is an eyeglasses lens measurement program that is used in an eyeglasses lens measurement device which includes a transmissive display that transmits a measurement light flux from a light source and is capable of displaying an index pattern formed by arranging a plurality of indexes, and measures an optical characteristic of an eyeglasses lens, the eyeglasses lens measurement program being executed by a processor of the eyeglasses lens measurement device to cause the eyeglasses lens measurement device to execute:
  a display control step of causing the transmissive display to display the index pattern; and
  an interval setting step of setting an interval of the plurality of indexes.

DESCRIPTION OF EMBODIMENTS

<Overview>

Figure 1:
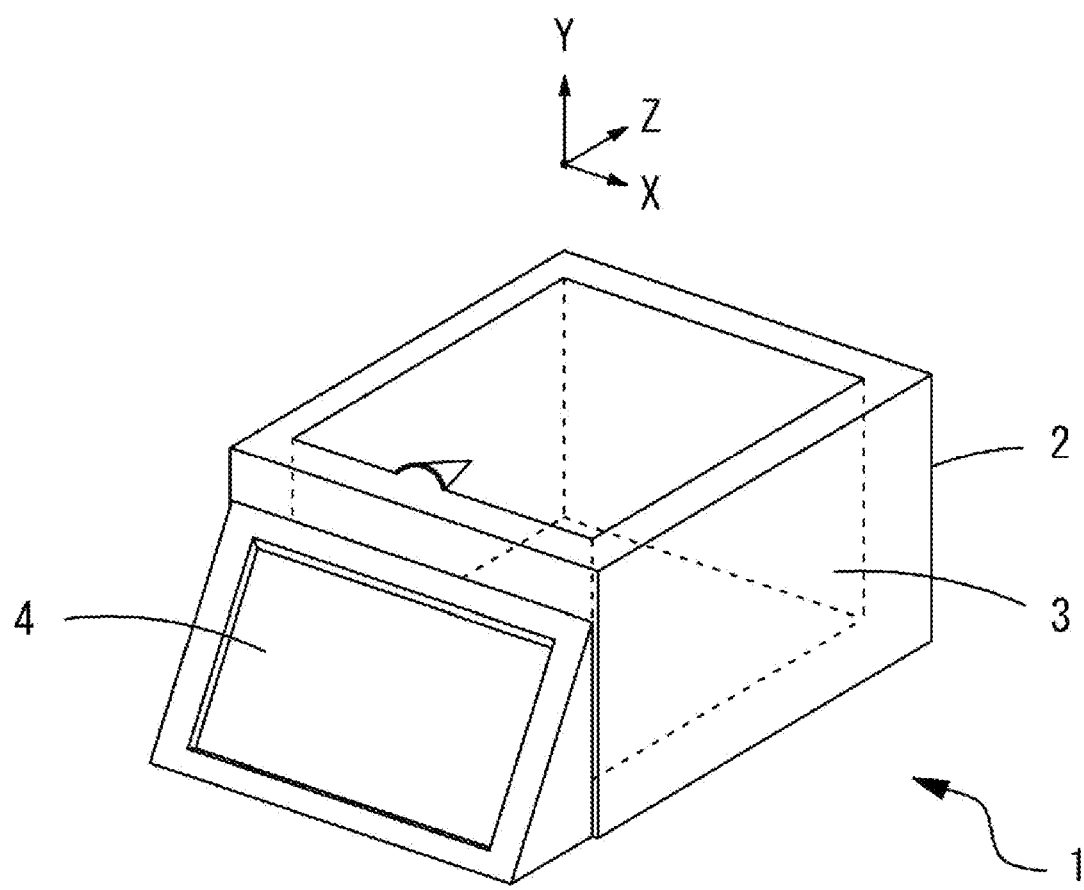
FIG. 1 is an external view of a measurement device.

An outline of an eyeglasses lens measurement device according to an embodiment of the present disclosure will be described. Items classified by < > below can be used independently or in relation to each other.

<Measurement Optical System>

The eyeglasses lens measurement device in the present embodiment includes a measurement optical system (for example, a measurement optical system 20). The measurement optical system includes a configuration for measuring an optical characteristic of an eyeglasses lens. For example, the optical characteristic of the eyeglasses lens may be at least any of spherical degree, cylindrical degree, astigmatic axis angle, prism amount, and the like. Further, the measurement optical system includes a configuration for acquiring lens information of the eyeglasses lens. For example, lens information of the eyeglasses lens is information different from the optical characteristic. For example, the lens information of the eyeglasses lens may be information different from the optical characteristic measured by the measurement optical system. As an example, the lens information of the eyeglasses lens may be at least any of information on a hidden mark formed on the eyeglasses lens, information on a mark point on the eyeglasses lens, information on a print mark on the eyeglasses lens, information on an outer shape of the eyeglasses lens, and the like. For example, the measurement optical system may serve as both at least a part of the configuration for measuring the optical characteristic of the eyeglasses lens and at least a part of the configuration for acquiring the lens information of the eyeglasses lens.

The measurement optical system may include at least a light source, a transmissive display, and a detector. For example, the measurement optical system may be configured to measure the optical characteristic of the eyeglasses by projecting a measurement light flux from a light source toward the eyeglasses lens and detecting the measurement light flux passing through the eyeglasses lens and the transmissive display by the detector. The measurement optical system may include a retroreflective member capable of reflecting back the measurement light flux from the light source in an incident direction to illuminate the eyeglasses lens. Further, the measurement optical system may include an optical member (for example, a collimator lens 23) for shaping the measurement light flux from the light source. Further, the measurement optical system may include an optical path branch member (for example, a half mirror 22) for branching the measurement light flux from the light source into a plurality of optical paths.

<Light Source>

The eyeglasses lens measurement device in the present embodiment includes the light source (for example, a light source 21). The light source emits the measurement light flux toward the eyeglasses lens. The light source may be disposed at any position. The light source may be a point light source. In this case, for example, a light emitting diode (LED) or the like may be used as the point light source. Further, the light source may be a surface light source. In this case, for example, a light emitting panel or the like may be used as the surface light source.

The light source may be a display capable of illuminating the eyeglasses lens by emitting the measurement light flux toward the eyeglasses lens. In this case, for example, as the light source, at least any of a liquid crystal display, an organic EL display, a plasma display, and the like may be used. The display can project the irradiation pattern onto the eyeglasses lens by displaying an irradiation pattern different from an index pattern formed by arranging a plurality of indexes described later. Further, the display can obtain an eyeglasses lens image, an index pattern image (index image) projected onto the eyeglasses lens, an irradiation pattern image projected onto the eyeglasses lens, and the like in a high contrast state by illuminating the eyeglasses lens, and can improve the detection accuracy of these images.

The light source may include a first light source and a second light source. For example, the first light source may be a light source for a left lens which emits the measurement light flux toward the left lens as the eyeglasses lens. Further, for example, the second light source may be a light source for a right lens which emits the measurement light flux toward the right lens as the eyeglasses lens.

The first light source may also serve as the second light source. That is, the first light source (second light source) may emit the measurement light flux toward the left lens as the eyeglasses lens and the right lens as the eyeglasses lens. For example, the first light source (second light source) may irradiate the left lens and the right lens in order with the measurement light flux. In this case, a changing means (for example, a motor or the like) for changing a relative positional relationship between the first light source (second light source) and the eyeglasses lens may be provided. Further, for example, the first light source (second light source) may irradiate both the left lens and the right lens with the measurement light flux. As an example, by disposing both the left lens and the right lens in the optical path which is irradiated with the measurement light flux from the first light source (second light source), both the left lens and the right lens may be irradiated with the measurement light flux. Therefore, the optical characteristic of the left lens and the right lens can be acquired at the same time. Further, by this, lens information can be acquired in the left lens and the right lens at the same time.

The first light source and the second light source may be provided in a pair on the left and right. That is, the first light source may emit the measurement light flux toward the left lens as the eyeglasses lens, and the second light source may emit the measurement light flux toward the right lens as the eyeglasses lens. In this case, an optical path of at least a part of the first optical path in which the measurement light flux is guided from the first light source toward the left lens, and the second optical path in which the measurement light flux is guided from the second light source toward the right lens may be a common optical path. Further, in this case, the first optical path in which the measurement light flux is guided from the first light source toward the left lens, the second optical path in which the measurement light flux is guided from the second light source toward the right lens may be different optical paths.

For example, the first light source and the second light source may be turned on at different timings, and may irradiate the left lens and the right lens in order with the measurement light flux. Further, for example, the first light source and the second light source may be turned on at the same (substantially the same) timing, and may irradiate both the left lens and the right lens with the measurement light flux. That is, the left lens and the right lens may be irradiated with the measurement light flux at the same time (substantially at the same time).

<Transmissive Display>

The eyeglasses lens measurement device in the present embodiment includes a transmissive display (for example, a transmissive display 24). The transmissive display transmits the measurement light flux from the light source. Further, the transmissive display is configured to display an index pattern (for example, an index pattern 30) formed by arranging a plurality of indexes (for example, indexes 31).

In the transmissive display, the index pattern formed by arranging the plurality of indexes is used for measuring the optical characteristic of the eyeglasses lens. The plurality of indexes are formed by any shape, any position, any number, and the like, whereby the index pattern is expressed. As an example, the plurality of indexes may have at least any shape of a point (for example, a circular point, a quadrangular point, or the like), a line (for example, a solid line, a dotted line, a broken line, or the like), and the like. Further, as an example, the plurality of indexes may be disposed in at least any of a grid pattern, a radial pattern, a concentric pattern, and the like.

In the measurement of the optical characteristic of the eyeglasses lens, the position information indicating a passing position where the measurement light flux from the light source has passed through the transmissive display may be acquired by using the index pattern. Therefore, it is preferable that the plurality of indexes are displayed to grasp the position information of the passing position of the transmissive display in the measurement light flux from the light source.

The transmissive display may include a first transmissive display and a second transmissive display. For example, the first transmissive display may be a left lens transmissive display that projects the index pattern image onto the left lens as the eyeglasses lens. Further, for example, the second transmissive display may be a right lens transmissive display that projects the index pattern image onto the right lens as the eyeglasses lens.

The first transmissive display may also serve as the second transmissive display. That is, the first transmissive display (second transmissive display) may project the index pattern image onto the left lens as the eyeglasses lens and the right lens as the eyeglasses lens. For example, the first transmissive display (second transmissive display) may project the index pattern image on both the left lens and the right lens by displaying the index pattern. This makes it possible to simultaneously project the index pattern onto the left lens and the right lens.

Further, for example, the first transmissive display (second transmissive display) may project the index pattern image onto the left lens and the right lens in order. In this case, the first transmissive display (second transmissive display) may include a first region for projecting the index pattern image onto the left lens and a second region for projecting the index pattern image onto the right lens. The first transmissive display (second transmissive display) may project the index pattern image onto the left lens and the right lens in order by displaying the index pattern in each region at different timings.

The first transmissive display and the second transmissive display may be provided in a pair on the left and right. That is, the first transmissive display may project the index pattern image onto the left lens as the eyeglasses lens, and the second transmissive display may project the index pattern image onto the right lens as the eyeglasses lens. For example, the first transmissive display and the second transmissive display may project the index pattern image on both the left lens and the right lens by displaying the index pattern at the same (substantially the same) timing. That is, the index pattern image may be projected onto the left lens and the right lens at the same time (substantially at the same time). Further, for example, the first transmissive display and the second transmissive display may project the index pattern image onto the left lens and the right lens in order by displaying the index pattern at different timings.

For example, by displaying the index pattern on the transmissive display, the position information of the passing position where the measurement light flux from the light source has passed through at least two points in the optical axis direction is acquired, and based on this, the optical characteristic of the eyeglasses lens is measured. As an example, the optical characteristic of the eyeglasses lens may be measured by using the position information indicating the passing position where the measurement light flux from the light source has passed through the eyeglasses lens, and the position information indicating the passing position where the measurement light flux from the light source has passed through the transmissive display. More specifically, the optical characteristic of the left lens may be measured by using the position information indicating the passing position where the measurement light flux from the light source has passed through the left lens as the eyeglasses lens, and the position information indicating the passing position where the measurement light flux from the light source has passed through the first transmissive display. Further, the optical characteristic of the right lens may be measured by using the position information indicating the passing position where the measurement light flux from the light source has passed through the right lens as the eyeglasses lens, and the position information indicating the passing position where the measurement light flux from the light source has passed through the second transmissive display.

Further, as an example, the optical characteristic of the eyeglasses lens may be measured by using only the position information indicating the passing position where the measurement light flux from the light source has passed through the transmissive display. More specifically, the optical characteristic of the left lens may be measured by using only the position information indicating the passing position where the measurement light flux from the light source has passed through the first transmissive display. Further, the optical characteristic of the right lens may be measured by using only the position information indicating the passing position where the measurement light flux from the light source has passed through the second transmissive display. In such a case, a changing means (for example, a moving mechanism 28) for changing a relative positional relationship between the first transmissive display and the left lens may be provided. Further, in such a case, the changing means (for example, the moving mechanism 28) for changing the relative positional relationship between the second transmissive display and the right lens may be provided.

The first transmissive display may include a transmissive display capable of displaying a first index pattern and a transmissive display capable of displaying a second index pattern. That is, the transmissive display capable of displaying the first index pattern may project the first index pattern image onto the left lens as the eyeglasses lens, and the transmissive display capable of displaying the second index pattern may project the second index pattern image onto the left lens as the eyeglasses lens. The transmissive display capable of displaying the first index pattern and the transmissive display capable of displaying the second index pattern are disposed at different positions in the optical axis direction. The first index pattern and the second index pattern may be the same index pattern. Of course, the first index pattern and the second index pattern may be at least partially different index patterns.

Further, the second transmissive display may include the transmissive display capable of displaying the first index pattern and the transmissive display capable of displaying the second index pattern. That is, the transmissive display capable of displaying the first index pattern may project the first index pattern image onto the right lens as the eyeglasses lens, and the transmissive display capable of displaying the second index pattern may project the second index pattern image onto the right lens as the eyeglasses lens. The transmissive display capable of displaying the first index pattern and the transmissive display capable of displaying the second index pattern are disposed at different positions in the optical axis direction. The first index pattern and the second index pattern may be the same index pattern. Of course, the first index pattern and the second index pattern may be at least partially different index patterns.

For example, by displaying the index pattern on each of the transmissive display capable of displaying the first index pattern and the transmissive display capable of displaying the second index pattern, the position information of the passing position where the measurement light flux from the light source has passed through at least two points in the optical axis direction is acquired, and based on this, a refraction angle of the measurement light flux is obtained and the optical characteristic of the eyeglasses lens is measured. More specifically, in the first transmissive display, the optical characteristic of the left lens as the eyeglasses lens may be measured by using the position information indicating the passing position where the measurement light flux from the light source has passed through the transmissive display capable of displaying the first index pattern, and the position information indicating the passing position where the measurement light flux from the light source has passed through the transmissive display capable of displaying the second index pattern. Further, in the second transmissive display, the optical characteristic of the right lens as the eyeglasses lens may be measured by using the position information indicating the passing position where the measurement light flux from the light source has passed through the transmissive display capable of displaying the first index pattern, and the position information indicating the passing position where the measurement light flux from the light source has passed through the transmissive display capable of displaying the second index pattern.

For example, by providing the transmissive display capable of displaying the first index pattern and the transmissive display capable of displaying the second index pattern at different positions in the optical axis direction, the position information of the passing position where the measurement light flux from the light source has passed through at least two points in the optical axis direction can be obtained regardless of the position where the measurement light flux from the light source passes through the eyeglasses lens, whereby the optical characteristic of the eyeglasses lens is measured. The optical characteristic of the eyeglasses lens can be accurately acquired with a simple configuration without providing the changing means for changing the relative positional relationship between the eyeglasses lens and the transmissive display.

<Detector>

The eyeglasses lens measurement device in the present embodiment includes a detector (for example, an imaging element 27). The detector detects the measurement light flux passing through the eyeglasses lens and the transmissive display. For example, the detector may detect the measurement light flux passing through the eyeglasses lens and the first transmissive display, and the measurement light flux passing through the eyeglasses lens and the second transmissive display. Further, for example, the detector may detect a reflected light flux which is the measurement light flux emitted from the light source and reflected on the retroreflective member described later. Further, for example, the detector may detect a measurement light flux from a display used as the light source.

The detector may be disposed at any position on the eyeglasses lens. The detector may detect the measurement light flux based on a signal (signal data). Further, the detector may detect the measurement light flux based on an image (image data) obtained by converting the signal (signal data).

The detector may include a first detector and a second detector. For example, the first detector may be a detector for the left lens, which detects the measurement light flux passing through the left lens as the eyeglasses lens and the transmissive display. Further, for example, the second detector may be a detector for the right lens, which detects the measurement light flux passing through the right lens as the eyeglasses lens and the transmissive display.

The first detector may also serve as the second detector. That is, the first detector (second detector) may detect the measurement light flux passing through the left lens as the eyeglasses lens and the transmissive display, and the measurement light flux passing through the right lens as the eyeglasses lens and the transmissive display. For example, the first detector (second detector) may detect the measurement light flux passing through the left lens and the transmissive display, and the measurement light flux passing through the right lens and the transmissive display in order. In this case, a changing means (for example, a motor or the like) for changing the relative positional relationship between the first detector (second detector) and the eyeglasses lens may be provided. Further, for example, the first detector (second detector) may detect both the measurement light flux passing through the left lens and the transmissive display, and the measurement light flux passing through the right lens and the transmissive display. Therefore, the optical characteristic of the left lens and the right lens can be acquired at the same time. Further, by this, lens information can be acquired in the left lens and the right lens at the same time.

The first detector and the second detector may be provided in a pair on the left and right. That is, the first detector may detect the measurement light flux passing through the left lens as the eyeglasses lens and the transmissive display, and the second detector may detect the measurement light flux passing through the right lens as the eyeglasses lens and the transmissive display. For example, the first detector and the second detector may detect the measurement light flux passing through the left lens and the transmissive display, and the measurement light flux passing through the right lens and the transmissive display in order. Further, for example, the first detector and the second detector may detect both the measurement light flux passing through the left lens and the transmissive display, and the measurement light flux passing through the right lens and the transmissive display. That is, the measurement light flux passing through the left lens and the transmissive display, and the measurement light flux passing through the right lens and the transmissive display may be detected at the same time.

In a case where the first detector and the second detector are provided in a pair on the left and right, the number of pixels of the detector can be effectively used for each of the left lens and the right lens as the eyeglasses lens, and the position of the index pattern image (index image) can be detected more accurately to improve the measurement accuracy of the optical characteristic. In addition, since it is not necessary to distinguish between the measurement light flux passing through the left lens and the transmissive display, and the measurement light flux passing through the right lens and the transmissive display, the optical characteristic of the eyeglasses lens and the lens information can be acquired by further simpler control.

<Retroreflective Member>

The eyeglasses lens measurement device in the present embodiment includes the retroreflective member (for example, a retroreflective member 25). The retroreflective member can irradiate the eyeglasses lens with the reflected light flux of the measurement light flux by reflecting back, in the incident direction, the measurement light flux which is emitted toward the eyeglasses lens from the light source, and passing through the eyeglasses lens and the transmissive display. That is, the retroreflective member can irradiate the eyeglasses lens with the reflected light flux of the measurement light flux by making the incident direction in which the measurement light flux from the light source is incident and the reflection direction in which the measurement light flux from the light source is reflected parallel (substantially parallel). In other words, the retroreflective member can reflect the measurement light flux from the light source to illuminate the eyeglasses lens. Therefore, the eyeglasses lens image and the index pattern image (index image) projected onto the eyeglasses lens can be obtained in a state of high contrast, and the detection accuracy of these images can be improved.

For example, the retroreflective member may reflect the measurement light flux from the light source and irradiate the front surface of the eyeglasses lens with the reflected light flux of the measurement light flux. As an example, in a case where the light source and the detector are disposed on a rear surface side of the eyeglasses lens, by disposing the retroreflective member on the front surface side of the eyeglasses lens, the measurement light flux from the light source may be reflected and the front surface of the eyeglasses lens may be irradiated with the reflected light flux of the measurement light flux. Further, for example, the retroreflective member may reflect the measurement light flux from the light source and irradiate the rear surface of the eyeglasses lens with the reflected light flux of the measurement light flux. As an example, in a case where the light source and the detector are configured to be disposed on the front surface side of the eyeglasses lens, by disposing the retroreflective member on the rear surface side of the eyeglasses lens, the measurement light flux from the light source may be reflected and the rear surface of the eyeglasses lens may be irradiated with the reflected light flux of the measurement light flux.

The retroreflective member may include a first retroreflective member and a second retroreflective member. For example, the first retroreflective member may be a retroreflective member for the left lens, which irradiates the left lens with the reflected light flux of the measurement light flux by reflecting back, in the incident direction, the measurement light flux which is emitted toward the left lens as the eyeglasses lens from the light source and passing through the left lens and the transmissive display. Further, for example, the second retroreflective member may be a retroreflective member for the right lens, which irradiates the right lens with the reflected light flux of the measurement light flux by reflecting back, in the incident direction, the measurement light flux which is emitted toward the right lens as the eyeglasses lens from the light source and passing through the right lens and the transmissive display.

The first retroreflective member may also serve as the second retroreflective member. That is, the first retroreflective member (second retroreflective member) may irradiate the left lens with the reflected light flux of the measurement light flux by reflecting back, in the incident direction, the measurement light flux which is emitted toward the left lens as the eyeglasses lens from the light source, and may irradiate the right lens with the reflected light flux of the measurement light flux by reflecting back, in the incident direction, the measurement light flux which is emitted toward the right lens as the eyeglasses lens from the light source.

The first retroreflective member and the second retroreflective member may be provided in a pair on the left and right. That is, the first retroreflective member may irradiate the left lens with the reflected light flux of the measurement light flux by reflecting back, in the incident direction, the measurement light flux which is emitted toward the left lens as the eyeglasses lens from the light source, and the second retroreflective member may irradiate the right lens with the reflected light flux of the measurement light flux by reflecting back, in the incident direction, the measurement light flux which is emitted toward the right lens as the eyeglasses lens from the light source.

In a case where the eyeglasses lens can be sufficiently illuminated by reflecting the measurement light flux from the light source, it is not always necessary to provide the retroreflective member. Further, in a case where one of the light source and the detector is disposed on the front surface side of the eyeglasses lens and the other of the light source and the detector is disposed on the rear surface side of the eyeglasses lens, it is not always necessary to provide the retroreflective member.

<Optical Disposition of Measurement Optical System>

In the present embodiment, the measurement optical system may include the light source, the detector, the transmissive display, the retroreflective member, and the like. Further, in the present embodiment, in the measurement optical system, the light source and the detector may be disposed on the front surface side of the eyeglasses lens, and the transmissive display and the reflective member may be disposed on the rear surface side of the eyeglasses lens.

For example, in the measurement optical system, in a case where the first light source may also serve as the second light source, and the first detector may also serve as the second detector, both the left lens and the right lens as the eyeglasses lens are irradiated with the measurement light flux emitted from the light source. Both the measurement light flux which is reflected by the retroreflective member passing through the left lens and the transmissive display and again passing through the transmissive display and the left lens, and the measurement light flux which is reflected by the retroreflective member passing through the right lens and the transmissive display and again passing through the transmissive display and the right lens are detected by the detector.

For example, in the measurement optical system, in a case where the first light source and the second light source are provided in a pair on the left and right, and the first detector and the second detector are provided in a pair on the left and right, the measurement light flux emitted from the first light source is reflected by the retroreflective member after passing through the left lens as the eyeglasses lens and the transmissive display, and again passing through the transmissive display and the left lens to be detected by the first detector. Further, the measurement light flux emitted from the second light source is reflected by the retroreflective member after passing through the right lens as the eyeglasses lens and the transmissive display, and again passing through the transmissive display and the right lens to be detected by the second detector.

For example, in the measurement optical system, in a case where the first light source may also serve as the second light source, and the first detector and the second detector are provided in a pair on the left and right, both the left lens and the right lens as the eyeglasses lens are irradiated with the measurement light flux emitted from the light source. The measurement light flux which is reflected by the retroreflective member after passing through the left lens and the transmissive display, and again passing through the transmissive display and the left lens is detected by the first detector, and the measurement light flux which is reflected by the retroreflective member after passing through the right lens and the transmissive display, and again passing through the transmissive display and the right lens is detected by the second detector.

For example, in the measurement optical system, in a case where the first light source and the second light source are provided in a pair on the left and right, and the first detector may also serve as the second detector, the left lens as the eyeglasses lens is irradiated with the measurement light flux emitted from the first light source, and the right lens as the eyeglasses lens is irradiated with the measurement light flux emitted from the second light source. Both the measurement light flux which is reflected by the retroreflective member after passing through the left lens and the transmissive display, and again passing through the transmissive display and the left lens, and the measurement light flux which is reflected by the retroreflective member after passing through the right lens and the transmissive display, and again passing through the transmissive display and the right lens are detected by the detector.

In any of the configurations described above, in the measurement optical system, the first transmissive display may also serve as the second transmissive display, or the first transmissive display and the second transmissive display may be provided in a pair on the left and right. The first transmissive display may include a transmissive display capable of displaying the first index pattern and a transmissive display capable of displaying the second index pattern, which are disposed at different positions in the optical axis direction. The second transmissive display may include a transmissive display capable of displaying the first index pattern and a transmissive display capable of displaying the second index pattern, which are disposed at different positions in the optical axis direction. Further, in any of the configurations described above, in the measurement optical system, the first retroreflective member may also serve as the second retroreflective member, or the first retroreflective member and the second retroreflective member may be provided in a pair on the left and right.

Further, in the present embodiment, the measurement optical system may include the display as the light source, the detector, the transmissive display, and the like. Further, in the present embodiment, in the measurement optical system, the detector may be disposed on the front surface side of the eyeglasses lens, and the display and the transmissive display may be disposed on the rear surface side of the eyeglasses lens.

For example, in the measurement optical system, in a case where the first display also serves as the second display, and the first detector also serves as the second detector, both the left lens and the right lens as the eyeglasses lens are irradiated with the measurement light flux emitted from the display. Both the measurement light flux passing through the left lens and the transmissive display and the measurement light flux passing through the right lens and the transmissive display are detected by the detector.

For example, in the measurement optical system, in a case where the first display and the second display are provided in a pair on the left and right, and the first detector and the second detector are provided in a pair on the left and right, the measurement light flux applied from the first display and going the left lens as the eyeglasses lens and the transmissive display is detected by the first detector. Further, the measurement light flux applied from the second display and passing through the right lens as the eyeglasses lens and the transmissive display is detected by the second detector.

For example, in the measurement optical system, in a case where the first display also serves as the second display, and the first detector and the second detector are provided in a pair on the left and right, both the left lens and the right lens as the eyeglasses lens are irradiated with the measurement light flux applied from the display. The measurement light flux passing through the left lens and the transmissive display is detected by the first detector, and the measurement light flux passing through the right lens and the transmissive display is detected by the second detector.

For example, in the measurement optical system, in a case where the first display and the second display are provided in a pair on the left and right, and the first detector also serves as the second detector, the left lens as the eyeglasses lens is irradiated with the measurement light flux emitted from the first display, and the right lens as the eyeglasses lens is irradiated with the measurement light flux emitted from the second display. Both the measurement light flux passing through the left lens and the transmissive display and the measurement light flux passing through the right lens and the transmissive display are detected by the detector.

In any of the configurations described above, in the measurement optical system, the first transmissive display may also serve as the second transmissive display or the first transmissive display and the second transmissive display may be provided in a pair on the left and right. The first transmissive display may include a transmissive display capable of displaying the first index pattern and a transmissive display capable of displaying the second index pattern, which are disposed at different positions in the optical axis direction. The second transmissive display may include a transmissive display capable of displaying the first index pattern and a transmissive display capable of displaying the second index pattern, which are disposed at different positions in the optical axis direction.

<Index Pattern Image Detecting Means>

The eyeglasses lens measurement device in the present example includes an index pattern image detecting means (for example, a controller 70). The index pattern image detecting means detects an image of the index pattern (index pattern image) projected onto the eyeglasses lens, based on the detection result of the detector. For example, the index pattern image detecting means may detect the index pattern image based on a signal (signal data) detected by the detector. As an example, the index pattern image detecting means may detect the index pattern image based on an intensity of the signal detected by the detector. Further, for example, the index pattern image detecting means may detect the index pattern image based on an image (image data) obtained by converting the signal detected by the detector. As an example, the index pattern image detecting means may acquire the index pattern image based on at least any of luminance information, saturation information, hue information, and the like of the image.

For example, the index pattern image detecting means may detect an interval of a plurality of index images constituting the index pattern image, based on the detection result of the detector. In this case, the interval of the plurality of index images may be detected by using pixel position information of the plurality of index images. Further, for example, the index pattern image detecting means may detect a shape of the index image constituting the index pattern image, based on the detection result of the detector. In this case, a shape of the index image may be detected by image processing (for example, binarization processing, contour extraction, edge detection, or the like). Further, in this case, an area of the index image may be detected based on the shape of the index image.

<Determination Means>

The eyeglasses lens measurement device in the present embodiment includes a determination means (for example, the controller 70). The determination means determines whether the eyeglasses lens is a minus lens or a plus lens based on a detection result of the detector. For example, the determination means may determine whether the eyeglasses lens is the minus lens or the plus lens based on a change in the pixel position information of the index image constituting the index pattern image obtained as the detection result of the detector. As an example, the determination means may determine that the eyeglasses lens is the minus lens in a case where the pixel positions of the index images are close to each other (in other words, in a case where the interval of the index image is narrowed). Further, as an example, the determination means may determine that the eyeglasses lens is the plus lens in a case where the pixel positions of the index images are separated from each other (in other words, in a case where the interval of the index image is widened).

For example, the determination means may determine whether the eyeglasses lens is an extreme minus lens or an extreme plus lens. In this case, the determination means may determine whether the eyeglasses lens is the extreme minus lens or the extreme plus lens based on a degree of change in the pixel position information of the index image obtained as the detection result of the detector. For example, a degree of change in the pixel position information of the index image may be represented by at least any of a rate of change in the pixel position information of the index image (enlargement rate or reduction rate), an amount of change in the pixel position information of the index image (enlargement amount or reduction amount), and the like.

<Interval Setting Means>

The eyeglasses lens measurement device in the present example includes an interval setting means (for example, the controller 70). The interval setting means is capable of setting the interval of the plurality of indexes constituting the index pattern in the transmissive display. For example, the interval setting means may set the interval of the plurality of indexes constituting the index pattern in the transmissive display to any interval. Further, for example, the interval setting means may set the interval of the plurality of indexes constituting the index pattern in the transmissive display to a predetermined interval. Therefore, an appropriate index pattern image corresponding to the eyeglasses lens can be obtained, and the optical characteristic can be accurately acquired. Further, the optical characteristic can be accurately acquired even in a case where a wide range of the optical characteristic of the eyeglasses lens is measured or in a case where a distribution of the optical characteristic of the eyeglasses lens is acquired.

For example, the interval setting means sets the interval of the plurality of indexes based on the instruction signal for setting the interval of the plurality of indexes. As an example, the interval setting means may set the interval of the plurality of indexes based on the instruction signal input by an operator operating an operation means (for example, the monitor 4). Further, as an example, the interval setting means may set the interval of a plurality of indexes, based on the instruction signal output based on the detection result of the detector.

In this case, the interval setting means may set the interval of the plurality of indexes by using a table or the like in which the detection result detected by the detector and the interval of the plurality of indexes displayed on the transmissive display are associated with each other. That is, the interval setting means may set the interval of the plurality of indexes to different intervals according to the detection result detected by the detector. For example, the table may be preset based on results of experiments and simulations, and the like.

Further, in this case, the interval setting means may set the interval of the plurality of indexes based on whether the detection result detected by the detector exceeds a predetermined threshold value. That is, the interval setting means may set the interval of the plurality of indexes to different intervals in a case where the detection result detected by the detector exceeds the predetermined threshold value and in a case where the detection result is less than the predetermined threshold value. The predetermined threshold value may be set as an allowable range. At this time, the interval setting means may set the interval of the plurality of indexes to different intervals in a case where the detection result detected by the detector is out of the allowable range and in a case where the detection result is within the allowable range. For example, the predetermined threshold value may be preset based on the results of experiments and simulations, and the like.

Therefore, the interval of the plurality of indexes can be automatically switched according to the eyeglasses lens, an appropriate index pattern image corresponding to the eyeglasses lens can be easily acquired, and the optical characteristic of the eyeglasses lens can be accurately acquired. Such setting of the interval of the plurality of indexes can be particularly effectively used in a fully automated device that automatically performs the measurement of the optical characteristic from the start to the completion thereof after the eyeglasses lens is placed.

The interval setting means may set the interval of the plurality of indexes displayed on the transmissive display, based on the detection result of the index pattern image detecting means. Therefore, the interval of the plurality of indexes is automatically set, and an appropriate index pattern image corresponding to the eyeglasses lens can be easily acquired.

For example, the interval setting means may set the interval of the plurality of indexes displayed on the transmissive display, based on the interval of the plurality of index images constituting the index pattern detected by the index pattern image detecting means. In this case, the interval of the index may be set by using a table or the like in which the interval of the plurality of index images constituting the index pattern detected by the index pattern image detecting means and the interval of the plurality of indexes displayed on the transmissive display are associated with each other. Further, in this case, the interval of the plurality of indexes may be set depending on whether the interval of the plurality of index images constituting the index pattern detected by the index pattern image detecting means exceeds the predetermined threshold value. For example, the predetermined threshold value may be set in a direction in which the interval of the index image is narrowed. Further, for example, the predetermined threshold value may be set in a direction in which the interval of the index image is widened. Of course, the predetermined threshold value may be provided as an allowable range in the direction in which the interval of the index image is narrowed and the direction in which the interval of the index image is widened.

Further, for example, the interval setting means may set the interval of the index based on the shapes of the plurality of index images constituting the index pattern detected by the index pattern image detecting means. In this case, the interval of the plurality of indexes may be set depending on whether the shapes of the plurality of index images detected by the index pattern image detecting means are deformed with respect to the shapes of the plurality of indexes displayed on the transmissive display. Further, in this case, the interval of the plurality of indexes may be set depending on whether a degree of deformation (for example, rate of deformation, amount of deformation, or the like) of the plurality of index images detected by the index pattern image detecting means exceeds the predetermined threshold value. For example, the deformation of the plurality of index images may be at least any of enlargement, reduction, distortion, chipping, and the like.

Further, for example, the interval setting means may set the interval of the plurality of indexes based on the areas of the plurality of index images constituting the index pattern detected by the index pattern image detecting means. In this case, the interval of the plurality of indexes may be set depending on whether the areas of the plurality of index images detected by the index pattern image detecting means have increased or decreased with respect to the areas of the plurality of indexes displayed on the transmissive display. Further, in this case, the interval of the plurality of indexes may be set depending on whether the degree of change in areas (for example, rate of change, amount of change, or the like) in the plurality of index images constituting the index pattern detected by the index pattern image detecting means exceeds the predetermined threshold value. In addition, for example, the predetermined threshold value may be set in a direction in which the area of the index image decreases. Further, for example, the predetermined threshold value may be set in a direction in which the area of the index image increases. Of course, the predetermined threshold value may be set as an allowable range in the direction in which the area of the index image decreases and the direction in which the area of the index image increases.

The interval setting means may set the interval of the plurality of indexes constituting the index pattern displayed on the transmissive display based on an acquisition result (calculation result of a calculation means) of the optical characteristic acquisition means. In this case, the interval of the plurality of indexes may be set by using a table or the like in which a refraction degree of the eyeglasses lens detected by the optical characteristic acquisition means and the interval of the plurality of indexes displayed on the transmissive display are associated with each other. Further, in this case, the interval of the plurality of indexes may be set depending on whether the refraction degree of the eyeglasses lens detected by the optical characteristic acquisition means exceeds a predetermined threshold value. In addition, for example, the predetermined threshold value may be set in a direction in which the refraction degree of the eyeglasses lens increases (rises). Further, for example, the predetermined threshold value may be set in a direction in which the refraction degree of the eyeglasses lens decreases (lowers). Of course, the predetermined threshold value may be set as an allowable range in the direction in which the refraction degree of the eyeglasses lens increases and in the direction in which the refraction degree of the eyeglasses lens decreases.

The interval setting means may set the interval of the plurality of indexes constituting the index pattern displayed on the transmissive display based on the determination result of the determination means. In this case, the interval of the plurality of indexes may be set by using a table or the like in which the type of the eyeglasses lens determined by the determination means and the interval of the index displayed on the transmissive display are associated with each other.

In the present embodiment, the interval of the plurality of indexes displayed on the transmissive display may be set, based on at least any of the above-mentioned detection result of the index pattern image detecting means, the acquisition result of the optical characteristic acquisition means (calculation result of the calculation means), and the determination result of the determination means.

The interval setting means may be able to set the interval of the plurality of indexes displayed on the transmissive display to two intervals, which are a first interval and a second interval different from the first interval. As an example, the interval setting means may set the second interval of the plurality of indexes displayed on the transmissive display to be shorter than the first interval of the plurality of indexes displayed on the transmissive display. Further, as an example, the interval setting means may set the second interval of the plurality of indexes displayed on the transmissive display to be longer than the first interval of the plurality of indexes displayed on the transmissive display.

Of course, for example, the interval setting means may be able to set the first interval, the second interval, and the third interval different from the first interval and the second interval of the plurality of indexes displayed on the transmissive display. As an example, the interval setting means may set the second interval of the plurality of indexes displayed on the transmissive display to be shorter than the first interval of the plurality of indexes displayed on the transmissive display, and may set the third interval of the plurality of indexes displayed on the transmissive display to a long interval than the first interval of the plurality of indexes displayed on the transmissive display.

The interval setting means may set an interval of at least a part of the indexes at different intervals in the first interval of the plurality of indexes and the second interval of the plurality of indexes. Further, the interval setting means may set the intervals of at least a part of the indexes at respective different intervals in the first interval of the plurality of indexes, the second interval of the plurality of indexes, and the third interval of the plurality of indexes. For example, the interval of the plurality of indexes may be set to different intervals only near the center of the index pattern formed by the arrangement of the plurality of indexes.

<Interval Switching Means>

The eyeglasses lens measurement device in the present embodiment includes an interval switching means (for example, the controller 70). The interval switching means switches between a first mode (for example, a normal mode) in which the first interval of the plurality of indexes is set by the interval setting means, and a second mode (for example, a wide interval mode) in which the second interval of the plurality of indexes is set by the interval setting means. For example, the interval switching means switches between the first mode and the second mode, based on an instruction signal for switching between the first mode and the second mode. As an example, the measurement switching means may switch between the first mode and the second mode, based on the instruction signal input by the operator operating the operation means. Further, as an example, the interval switching means may switch between the first mode and the second mode, based on the instruction signal output based on the detection result of the detector. For example, in this case, the interval switching means may switch between the first mode and the second mode, based on the instruction signal output based on the detection result of the detector. More specifically, the interval switching means may switch between the first mode and the second mode, based on the instruction signal which is output based on at least any of the detection result of the index pattern image detecting means, the acquisition result of the optical characteristic acquisition means (calculation result of the calculation means), the determination result of the determination means, and the like. Therefore, an appropriate mode according to the eyeglasses lens is applied, and the optical characteristic of the eyeglasses lens can be easily acquired.

<Display Control Means>

The eyeglasses lens measurement device in the present embodiment includes a display control means (for example, the controller 70). The display control means controls the display of the plurality of indexes in the transmissive display. That is, the display control means controls the display of the index pattern in the transmissive display. The display control means may express the index pattern by displaying the plurality of indexes at predetermined positions in the transmissive display. The predetermined position may be a position designated by the operator or may be a preset position. Further, the display control means may express the index pattern by displaying the plurality of indexes having the intervals set in the interval setting means. That is, the display control means may properly use the index pattern according to various eyeglasses lenses.

For example, in the transmissive display, the display control means can display the index pattern which is an arrangement of the plurality of indexes. Further, for example, the display control means can cause not to display the index pattern which is the arrangement of the plurality of indexes, in the transmissive display. For example, the display control means can cause to partially display the plurality of indexes and not to partially display the plurality of indexes, to cause to partially display the index pattern (or cause not to partially display the index pattern) in the transmissive display.

In the present embodiment, the display control means displays the index pattern in the transmissive display, and thereby the optical characteristic of the eyeglasses lens is acquired by the optical characteristic acquisition means which is described later. For example, in a case where the transmissive display is disposed at a different position in the optical axis direction, the display control means causes the transmissive display capable of displaying the first index pattern to display the first index pattern, and the transmissive display capable of displaying the second index pattern to display the second index pattern, and thereby the optical characteristic of the eyeglasses lens is acquired by the optical characteristic acquisition means.

In a case where the transmissive display is disposed at a different position in the optical axis direction, the display control means may individually control each of the display of the first index pattern in the transmissive display capable of displaying the first index pattern, and the display of the second index pattern in the transmissive display capable of displaying the second index pattern.

For example, in the transmissive display capable of displaying the first index pattern and the transmissive display capable of displaying the second index pattern, when displaying one of the first index pattern and the second index pattern, at least a part of the other of the first index pattern and the second index pattern may not be displayed. As an example, the display control means may cause not to display the second index pattern when displaying the first index pattern, and cause to display the second index pattern when not displaying the first index pattern. Further, as an example, the display control means may cause not to display the second index pattern (in other words, a part of the plurality of indexes) when displaying the first index pattern (in other words, all the plurality of indexes), and display the second index pattern (in other words, all the plurality of indexes) when not displaying the first index pattern (in other words, a part of the plurality of indexes). Therefore, the first index pattern image and the second index pattern image do not overlap, and the position of each index pattern image (index image) can be accurately detected, and thus, the optical characteristic can be accurately measured.

Further, in a case where the transmissive display is disposed at a different position in the optical axis direction, the display control means may simultaneously (substantially simultaneously) control the display of the first index pattern in the transmissive display capable of displaying the first index pattern and the display of the second index pattern in the transmissive display capable of displaying the second index pattern. For example, both the first index pattern and the second index pattern may be displayed on the transmissive display capable of displaying the first index pattern and the transmissive display capable of displaying the second index pattern. Therefore, the first index pattern image and the second index pattern image can be detected at one time, and thus, the measurement time is shortened.

In the present embodiment, the display control means causes not to display at least a part of the index pattern of the transmissive display to acquire the lens information of the eyeglasses lens by the lens information acquisition means which is described later. For example, in a case where the transmissive display is disposed at different positions in the optical axis direction, the display control means causes not to display at least a part of the first index pattern in the transmissive display capable of displaying the first index pattern, and causes not to display at least a part of the second index pattern in the transmissive display capable of displaying the second index pattern, and thereby the lens information of the eyeglasses lens is acquired by the lens information acquisition means.

In such a case, the display control means may also cause not to display the index pattern (in other words, all the plurality of indexes) in the transmissive display. Further, in such a case, the display control means may cause not to display a part of the index pattern (in other words, a part of the plurality of indexes). For example, the index pattern may not be displayed only in the region where the lens information of the eyeglasses lens can be obtained. As an example, only the index projected onto the eyeglasses lens may not be displayed, and the index projected onto the outside of the eyeglasses lens may be displayed. Further, as an example, only the index projected onto the vicinity of the hidden mark formed on the eyeglasses lens may not be displayed, and the index projected onto the outside of the vicinity of the hidden mark formed on the eyeglasses lens may be displayed.

For example, in the present embodiment, the display control means displays the index pattern on the transmissive display to acquire the optical characteristic of the eyeglasses lens by the optical characteristic acquisition means which is described later, and the display control means causes not to display at least a part of the index pattern of the transmissive display to acquire the lens information of the eyeglasses lens by the lens information acquisition means which is described later. Therefore, the optical characteristic and the lens information of the eyeglasses lens can be acquired with a simple configuration without individually providing each optical system for obtaining the optical characteristic and the lens information, or requiring complicated control.

In the present embodiment, in a case where the display control means is switched, by the interval switching means, to any of the first mode in which the first interval of the plurality of indexes is set and the second mode in which the second interval of the plurality of indexes is set, one of the first index pattern formed by the index having the first interval and the second index pattern formed by the index having the second interval may be displayed on the transmissive display. For example, by appropriately setting the first mode and the second mode, it is possible to deal with any eyeglasses lens including the eyeglasses lens in which the optical characteristic can be accurately acquired by projecting the index pattern having a predetermined index interval, and the eyeglasses lens in which the optical characteristic is difficult to be accurately acquired by projecting the index pattern having the predetermined index interval.

<Optical Characteristic Acquisition Means>

The eyeglasses lens measurement device in the present embodiment includes an optical characteristic acquisition means (for example, the controller 70). The optical characteristic acquisition means acquires the optical characteristic of the eyeglasses lens based on the detection result of the detector. The optical characteristic acquisition means may acquire the distribution of the optical characteristic of the eyeglasses lens by acquiring the optical characteristic at a plurality of positions of the eyeglasses lens, based on the detection result of the detector.

For example, the optical characteristic acquisition means may acquire the optical characteristic of the eyeglasses lens by performing a ray tracing process on the measurement light flux from the light source. In this case, the optical characteristic acquisition means may acquire the optical characteristic of the eyeglasses lens by obtaining the position information of the passing position where the measurement light flux from the light source has passed at least two points in the optical axis direction. Further, the optical characteristic acquisition means may use the position information of the passing position where the measurement light flux from the light source has passed through at least two points in the optical axis direction, calculate the refraction angle at which the measurement light flux from the light source is refracted by the refraction power of the eyeglasses lens, and acquire the optical characteristic of the eyeglasses lens.

As an example, the optical characteristic acquisition means may acquire the optical characteristic of the eyeglasses lens, based on the position information of the passing position where the measurement light flux from the light source has passed through the eyeglasses lens and the position information of the passing position where the measurement light flux from the light source has passed through the transmissive display. Further, as an example, the optical characteristic acquisition means may acquire the optical characteristic of the eyeglasses lens, based on the position information of the passing position where the measurement light flux from the light source has passed through the transmissive display capable of displaying the first index pattern, and the position information of the passing position where the measurement light flux has passed through the transmissive display capable of displaying the second index pattern.

In the present embodiment, the optical characteristic acquisition means may acquire the refraction degree of the eyeglasses lens as the optical characteristic of the eyeglasses lens, based on the detection result of the detector. That is, in the present embodiment, the optical characteristic acquisition means may also serve as the calculation means for calculating the refraction degree of the eyeglasses lens based on the detection result of the detector.

<Lens Information Acquisition Means>

The eyeglasses lens measurement device in the present embodiment includes lens information acquisition means (for example, the controller 70). The lens information acquisition means acquires lens information different from the optical characteristic of the eyeglasses lens, based on the detection result of the detector. For example, the lens information acquisition means may acquire the lens information based on a signal (signal data) detected by the detector. As an example, the lens information acquisition means may acquire the lens information based on the intensity of the signal detected by the detector. Further, for example, the lens information acquisition means may acquire the lens information based on an image (image data) obtained by converting the signal detected by the detector. As an example, the lens information acquisition means may acquire the lens information based on at least any of the luminance information, the saturation information, the hue information, and the like of the image.

<Measurement Switching Means>

The eyeglasses lens measurement device in the present embodiment includes a measurement switching means (for example, the controller 70). The measurement switching means switches between a first mode in which the optical characteristic of the eyeglasses lens is acquired by the optical characteristic acquisition means (for example, an optical characteristic measurement mode), and a second mode in which the lens information of the eyeglasses lens is acquired by the lens information acquisition means (for example, a lens information acquisition mode). For example, the measurement switching means switches between the first mode and the second mode, based on the instruction signal for switching between the first mode and the second mode. As an example, the measurement switching means may switch between the first mode and the second mode, based on the instruction signal input by the operator operating the operation means. Further, as an example, the measurement switching means may switch between the first mode and the second mode, based on the instruction signal output based on the detection result of the detector. For example, in this case, the measurement switching means may switch between the first mode and the second mode, based on the instruction signal output by acquiring the optical characteristic of the eyeglasses lens based on the detection result of the detector. Further, for example, in this case, the measurement switching means may determine the type of the eyeglasses lens based on the detection result of the detector, and switch between the first mode and the second mode based on the instruction signal output based on the determination result of a determination of the type of the eyeglasses lens. Therefore, an appropriate mode can be applied according to the eyeglasses lens, and the optical characteristic and the lens information of the eyeglasses lens can be easily acquired.

The present disclosure can be applied to an eyeglasses lens measurement device including a measurement optical system (for example, the measurement optical system 20) for measuring the optical characteristic of the eyeglasses lens. As an example, the present disclosure may be applied to a cup attaching device in which the optical characteristic of the eyeglasses lens is measured by projecting the measurement light flux from the light source onto the eyeglasses lens and detecting the measurement light flux passing through the eyeglasses lens by the detector, and a cup used for processing a periphery of the eyeglasses lens is attached based on the measurement result of the optical characteristic of the eyeglasses lens.

The present disclosure is not limited to the device described in the present embodiment. For example, terminal control software (program) that performs functions of the embodiment described above may be supplied to the system or the device via a network, various storage media, or the like, and a control device (for example, CPU or the like) of the system or the device may read and execute the program.

EXAMPLES

An example of an eyeglasses lens measurement device (hereinafter referred to as a measurement device) in the present embodiment will be described. In the present example, the left-right direction of the measurement device 1 is represented by an X direction, the up-down direction (vertical direction) is represented by a Y direction, and the front-back direction is represented by a Z direction.

FIG. 1 is an external view of the measurement device 1. For example, the measurement device 1 includes a housing 2, a storage unit 3, a monitor 4, and the like.

The housing 2 has the storage unit 3 inside thereof. An eyeglasses support unit 10, which will be described later, a lens measurement unit, which will be described later, and the like are stored in the storage unit 3. The monitor 4 displays various information (for example, an optical characteristic of a lens LE, a distribution of the optical characteristic of the lens LE, a hidden mark image 65 of the lens LE, and the like). The monitor 4 is a touch panel. That is, the monitor 4 also functions as an operation unit, and is used when the operator performs various settings (for example, change of index interval, start of measurement, mode switching, or the like). A signal corresponding to an operation instruction input from the monitor 4 by the operator is output to a controller 70 which is described later.

Figure 2:
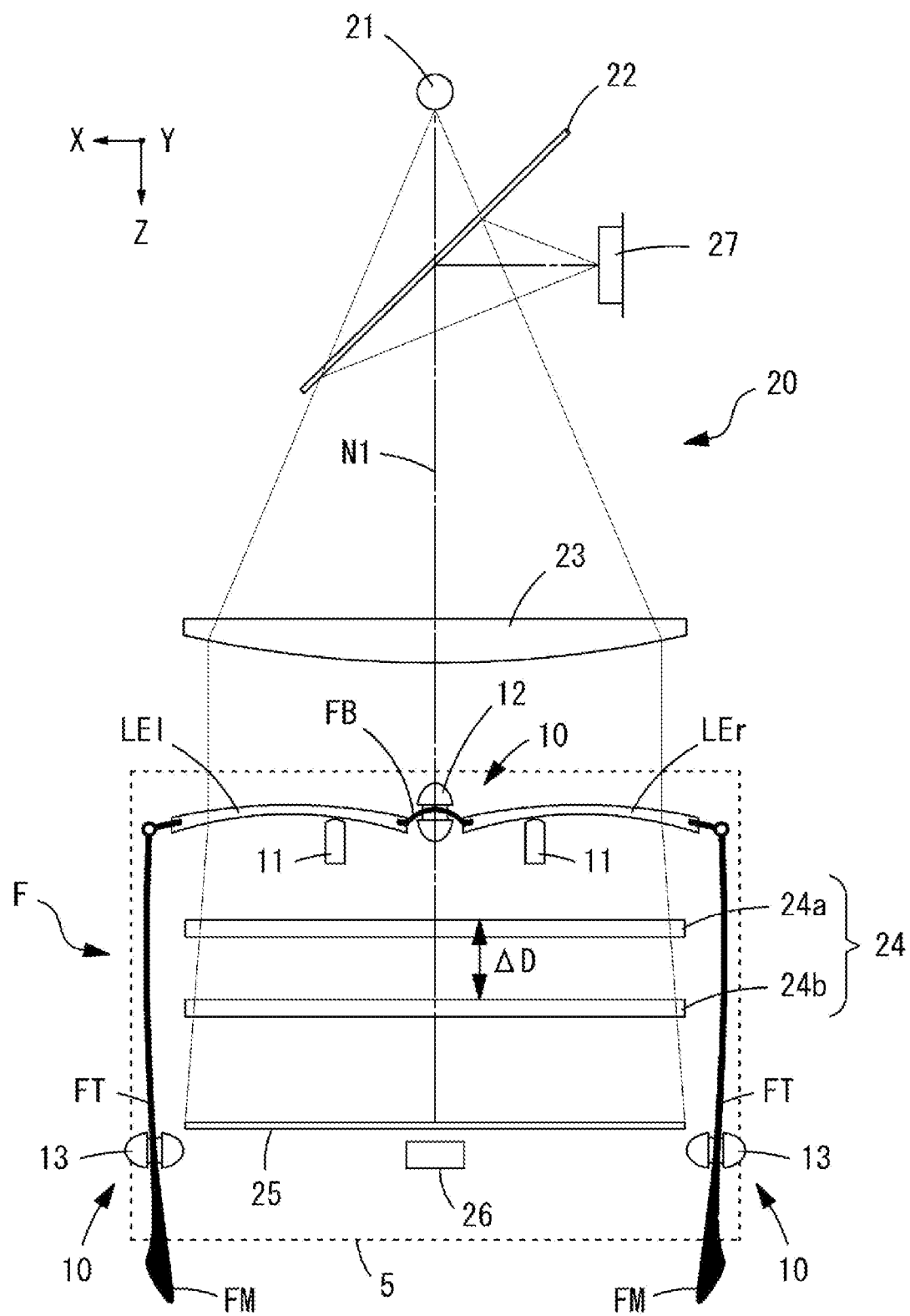
FIG. 2 is a schematic view of an eyeglasses support unit and a lens measurement unit.

FIG. 2 is a schematic view of the eyeglasses support unit 10 and the lens measurement unit.

<Support Unit>

The eyeglasses support unit 10 is used for placing an eyeglasses F. For example, the eyeglasses support unit 10 includes a positioning pin 11, a front support portion 12, a rear support portion 13, and the like.

The positioning pin 11 is in contact with a rear surface of the lens LE of the eyeglasses F. The positioning pin 11 keeps a positional relationship between the lens LE and a transmissive display 24, which is described later, constant. Further, the positioning pin 11 keeps the positional relationship between the lens LE and an imaging element 27, which is described later, constant.

The front support portion 12 supports a portion in front of the center in the front-back direction (that is, the direction in which a temple FT of the eyeglasses F extends) in a state where the eyeglasses F are worn. For example, the front support portion 12 supports a bridge FB of the eyeglasses F. The front support portion 12 is not limited to the present example, and may support a rim of the eyeglasses F as an example. The rear support portion 13 supports a portion in rear of the center in the front-back direction in a state where the eyeglasses F are worn. For example, the rear support portion 13 supports the temple FT of the eyeglasses F. The rear support portion 13 is not limited to the present example, and may support the modern FM of the eyeglasses F, as an example. For example, in the present example, the eyeglasses F are placed on the front support portion 12 and the rear support portion 13 with an upper end of the rim of the eyeglasses F facing upward and a lower end of the rim of the eyeglasses F facing downward.

The front support portion 12 and the rear support portion 13 may be movably disposed on a base 5. For example, the front support portion 12 may be disposed to be movable in the up-down direction (Y direction) by a drive mechanism which is not shown. Further, for example, the rear support portion 13 may be disposed to be movable in the up-down direction (Y direction) by a drive mechanism which is not shown. For example, by moving at least any of the front support portion 12 and the rear support portion 13 in the up-down direction, a forward tilting angle of the eyeglasses F in the state where the eyeglasses F is worn can be adjusted. Further, for example, by moving at least any of the front support portion 12 and the rear support portion 13 in the up-down direction, the rear surface of the lens LE of the eyeglasses F and the bottom surface of the positioning pin 11 can be parallel (substantially parallel) with each other.

<Lens Measurement Unit>

The lens measurement unit is used to measure the optical characteristic of the lens LE framed in the eyeglasses F. Further, the lens measurement unit is used to detect information different from the optical characteristic of the lens LE framed in the eyeglasses F. For example, the lens measurement unit includes a measurement optical system 20.

In the present example, in the measurement optical system 20, a configuration is taken as an example in which a light source 21, which serves as both a light source for irradiating the left lens LEl of the eyeglasses F with the measurement light flux and a light source for irradiating the right lens LEr of the eyeglasses F with the measurement light flux, is used. Further, in the present example, in the measurement optical system 20, a configuration is taken as an example in which the imaging element 27, which serves as both an imaging element for detecting the measurement light flux with which the left lens LEl of the eyeglasses F is irradiated and an imaging element for detecting the measurement light flux with which the right lens LEr of the eyeglasses F is irradiated, is used. The measurement optical system 20 is not limited to such a configuration, and various configurations can be used. For example, the measurement optical system 20 includes a light source 21, a half mirror 22, a collimator lens 23, a transmissive display 24, a retroreflective member 25, an imaging element 27, and the like.

The light source 21 emits the measurement light flux toward the lens LE of the eyeglasses F. The collimator lens 23 shapes the measurement light flux from the light source 21 to be parallel (substantially parallel) with the optical axis N1.

The transmissive display 24 is a display having a high transmittance capable of transmitting the measurement light flux from the light source 21. The transmissive display 24 can display an index pattern 30, which is described later. For example, by displaying the index pattern 30 in the transmissive display 24, in a case where the measurement light flux from the light source 21 transmits through the transmissive display 24, the index pattern 30 is formed on the measurement light flux. For example, if the transmissive display 24 is not displayed, the measurement light flux from the light source 21 passes by the transmissive display 24, and the index pattern 30 is not formed on the measurement light flux.

In the present example, as the transmissive display 24, a first transmissive display 24a and a second transmissive display 24b are provided. The first transmissive display 24a and the second transmissive display 24b are disposed to align their upper and lower centers and left and right centers with an optical axis L1. Further, the first transmissive display 24a and the second transmissive display 24b are disposed with a predetermined distance ΔD in the optical axis N1 direction.

The retroreflective member 25 reflects the measurement light flux from the light source 21 in the same (substantially the same) direction as the incident direction, and illuminates the lens LE of the eyeglasses F from the rear surface. The retroreflective member 25 may be rotated at high speed by a drive mechanism 26 (for example, a motor or the like). Therefore, a reflection unevenness of the retroreflective member 25 caused by a variation in a distribution of glass globules which is not shown, a reflective film which is not shown, and the like can be made uniform.

The imaging element 27 images the reflected light flux which is the measurement light flux, from the light source 21, reflected by the retroreflective member 25. The focus of the imaging element 27 is aligned with the vicinity of the front surface of the lens LE of the eyeglasses F. Therefore, for example, the hidden mark formed on the lens LE of the eyeglasses F is imaged in a substantially focused state.

For example, the measurement light flux from the light source 21 passes through the half mirror 22, is converted into a parallel light flux by the collimator lens 23, and reaches the lens LE of the eyeglasses F. Subsequently, in a case where the measurement light flux transmits the lens LE, the measurement light flux converges or diverges due to the refraction power of the lens LE, passes by the transmissive display 24, and reaches the retroreflective member 25. Further, the measurement light flux is reflected by the retroreflective member 25, passes through the transmissive display 24, the lens LE, and the collimator lens 23 again, is reflected by the half mirror 22, and reaches the imaging element 27. The imaging element 27 images the measurement light flux passing through each member.

<Index Pattern>

Figure 3A:
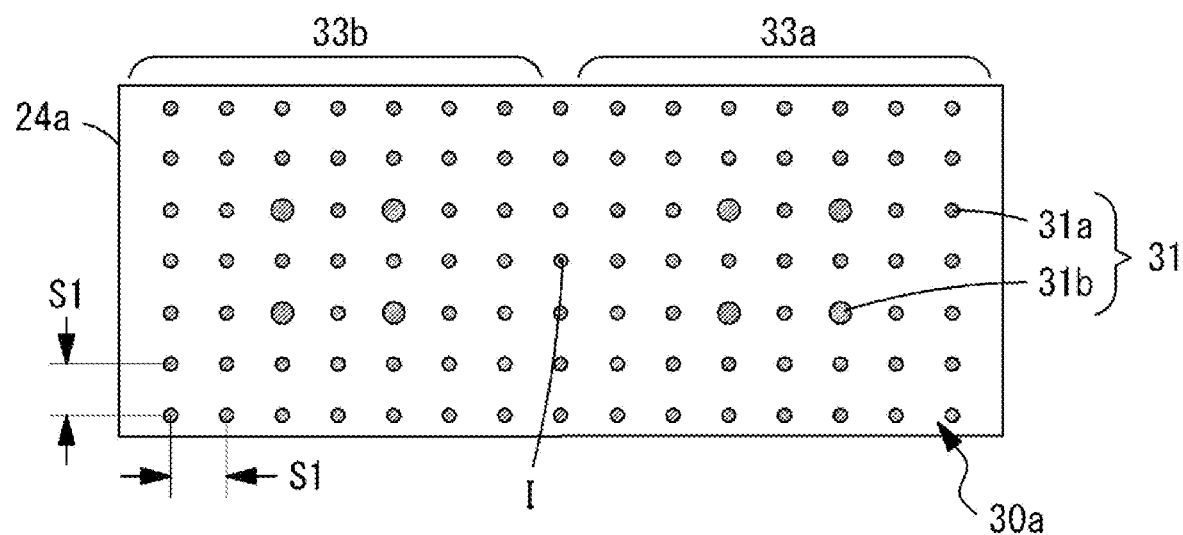
FIG. 3A is an example of an index pattern in which an interval of a plurality of indexes is a predetermined distance.
Figure 3B:
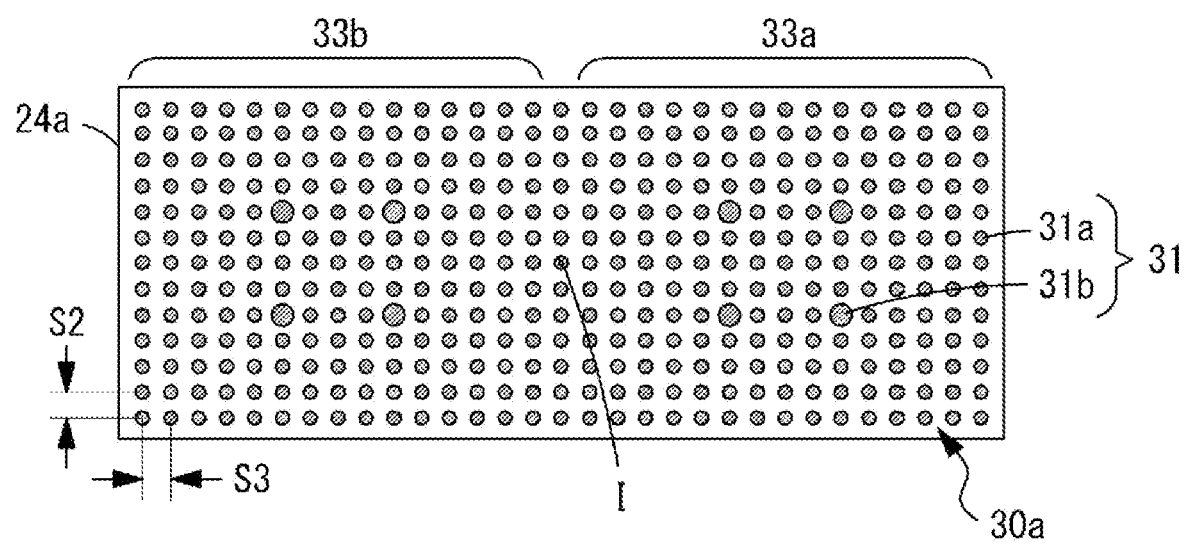
FIG. 3B is an example of an index pattern in which the interval of the plurality of indexes is shorter than the predetermined distance.
Figure 3C:
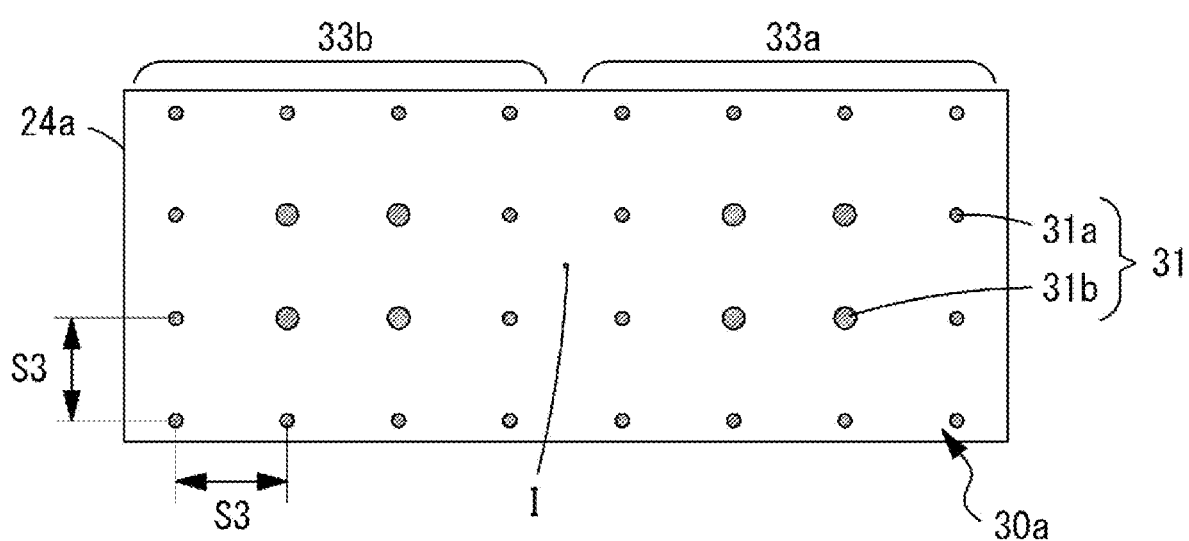
FIG. 3C is an example of an index pattern in which the interval of the plurality of indexes is longer than the predetermined distance.

FIGS. 3A, 3B, and 3C are examples of the index pattern 30 that can be displayed on the transmissive display 24. Here, a first index pattern 30a that can be displayed on the first transmissive display 24a will be taken as an example. Since a second index pattern 30b that can be displayed on the second transmissive display 24b has the same configuration as the following, the description of the second index pattern 30b will be omitted.

The first transmissive display 24a can display the index 31 on the screen. The index 31 includes a peripheral index 31a and a reference index 31b.

For example, the peripheral index 31a is provided, in advance, around the reference index 31b with a predetermined shape, a predetermined position, a predetermined number, and the like. In the present example, the peripheral index 31a is formed in a circular shape. Further, in the present example, the peripheral index 31a is disposed in each of a right region 33a on a side where the left lens LEl of the eyeglasses F is disposed, and a left region 33b on a side where the right lens LEr of the eyeglasses F is disposed. The peripheral index 31a is disposed in each of the right region 33a and the left region 33b to be left-right symmetrical with respect to an axis in the up-down direction (Y direction) through a passing position I of the optical axis L1. Further, in the present example, a large number of peripheral indexes 31a are disposed.

For example, the reference index 31b may be distinguished from the peripheral index 31a, and is provided, in advance, with a predetermined shape, a predetermined position, a predetermined number, and the like. In the present example, the reference index 31b is formed in a circular shape which is larger than the peripheral index 31a. Further, in the present example, the reference index 31b is disposed in each of the right region 33a and the left region 33b to be left-right symmetrical with respect to the axis in the up-down direction (Y direction) through the passing position I of the optical axis L1. Further, in the present example, four reference indexes 31b are disposed. For example, the reference index 31b makes it easy to specify a positional relationship of each peripheral index 31a.

The first transmissive display 24a expresses the first index pattern 30a formed by the plurality of indexes 31 by displaying the plurality of indexes 31. As an example, as shown in FIG. 3A, the first index pattern 30a in which the interval of the plurality of indexes 31 is a distance S1 can be expressed. Further, as an example, as shown in FIG. 3B, the first index pattern 30a in which the interval of the plurality of indexes 31 is a distance S2 which is shorter than the distance S1 can be expressed. Further, as an example, as shown in FIG. 3C, the first index pattern 30a in which the interval of the plurality of indexes 31 is a distance S3 which is longer than the distance S1 can be expressed. For example, the display and non-display of the plurality of indexes 31 are controlled by the controller 70, which is described later.

In the first transmissive display 24a, one index 31 is set as a display unit (segment), segments are arranged at equal interval, and the first index pattern 30a which is formed by the plurality of indexes 31 may be expressed depending on whether a voltage is applied to each segment. In other words, the first transmissive display 24a may express the first index pattern 30a which is formed by the plurality of indexes 31 by a segment display. For example, in a case where the voltage is applied to the segment, the index 31 is displayed. For example, in a case where no voltage is applied to the segment or in a case where an application of the voltage to the segment is stopped, the index 31 is not displayed. For example, each index 31 may be formed by printing.

For example, in a case where the voltage is applied to all the segments provided in the first transmissive display 24a, the index 31 is displayed on all the segments. In this case, the first index pattern 30a in which the interval of the plurality of indexes 31 is a predetermined distance (that is, the shortest distance that can be represented by the plurality of indexes 31) can be expressed. Further, in a case where the voltage is applied to a specific segment provided in the first transmissive display 24a, the index 31 is displayed only in the specific segment. In this case, as an example, it is possible to express the first index pattern 30a in which the interval of the plurality of indexes 31 is set to longer than the shortest distance described above by applying the voltage to every other segment. Of course, it is also possible to express the first index pattern 30a in which the interval of the plurality of indexes 31 is set to a longer distance by applying the voltage to every third segment, every fourth segment, every fifth segment, and the like.

In the present example, the first index pattern 30a of the first transmissive display 24a and the second index pattern 30b of the second transmissive display 24b are configured to have the same pattern. That is, the shape of the index 31 in the first index pattern 30a and the shape of the index 31 in the second index pattern 30b are configured to be the same. Further, the position of the index 31 in the first index pattern 30a and the position of the index 31 in the second index pattern 30b are configured to be the same. Further, the number of indexes 31 in the first index pattern 30a and the number of indexes 31 in the second index pattern 30b are configured to be the same.

However, in the present example, the first index pattern 30a of the first transmissive display 24a and the second index pattern 30b of the second transmissive display 24b may be configured to have a different pattern in at least a part of the first index pattern 30a and the second index pattern 30b. That is, the shape of the index 31 in the first index pattern 30a and the shape of the index 31 in the second index pattern 30b may be configured to be different from each other. Further, the position of the index 31 in the first index pattern 30a and the position of the index 31 in the second index pattern 30b may be configured to be different from each other. Further, the number of indexes 31 in the first index pattern 30a and the number of indexes 31 in the second index pattern 30b may be configured to be different from each other.

<Index Pattern Image>

For example, when the measurement light flux from the light source 21 is imaged by the imaging element 27, an electric signal is processed by the controller 70, which is described later, and a captured image is obtained.

Figure 4A:
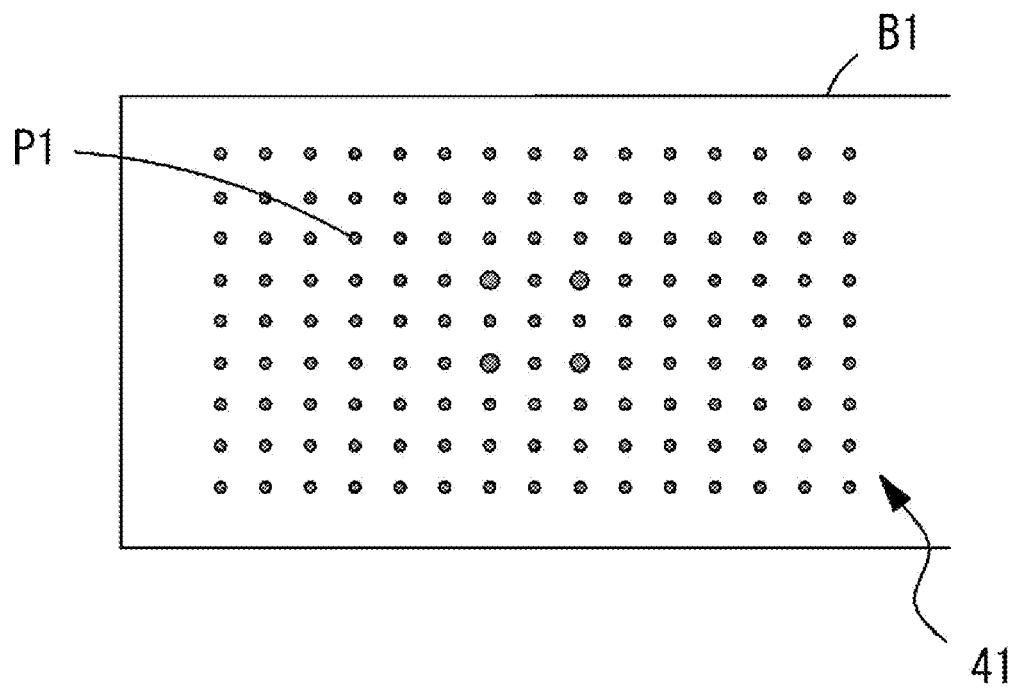
FIG. 4A is an example of a captured image obtained by displaying a first index pattern in a state where the eyeglasses are not placed on the eyeglasses support unit.
Figure 4B:
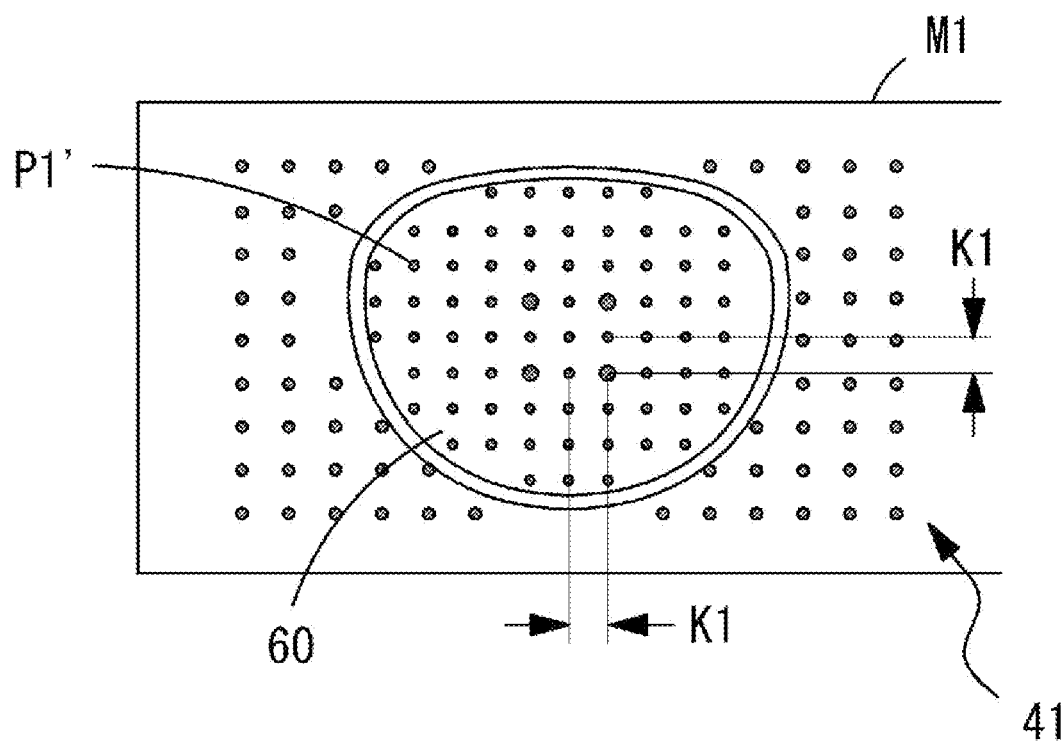
FIG. 4B is an example of a captured image obtained by displaying a first index pattern in a case where the eyeglasses are placed on an eyeglasses support unit.
Figure 5A:
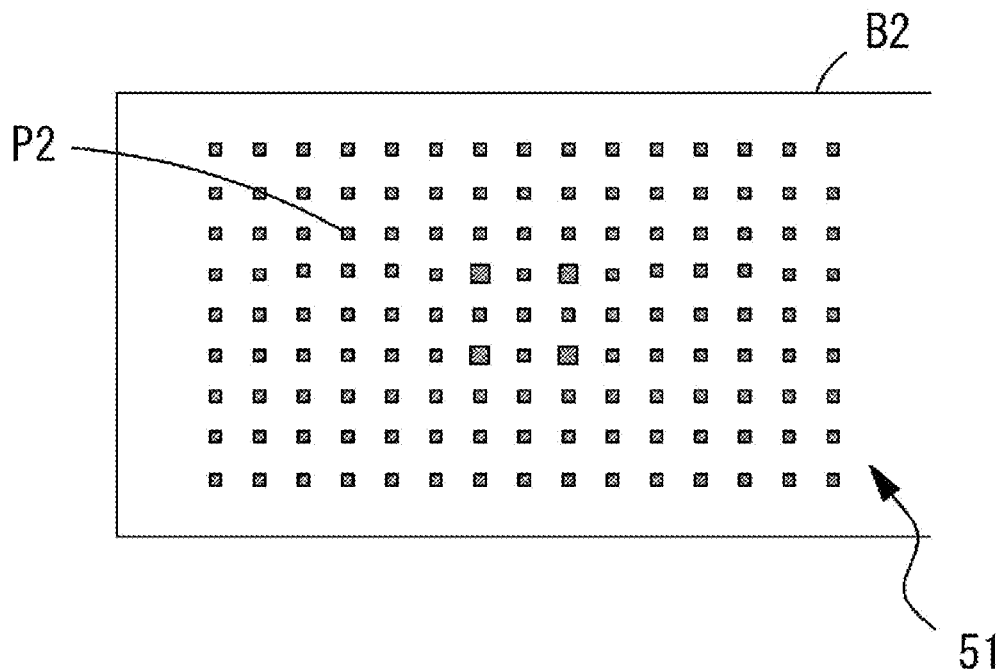
FIG. 5A is an example of a captured image obtained by displaying a second index pattern in a state where the eyeglasses are not placed on the eyeglasses support unit.
Figure 5B:
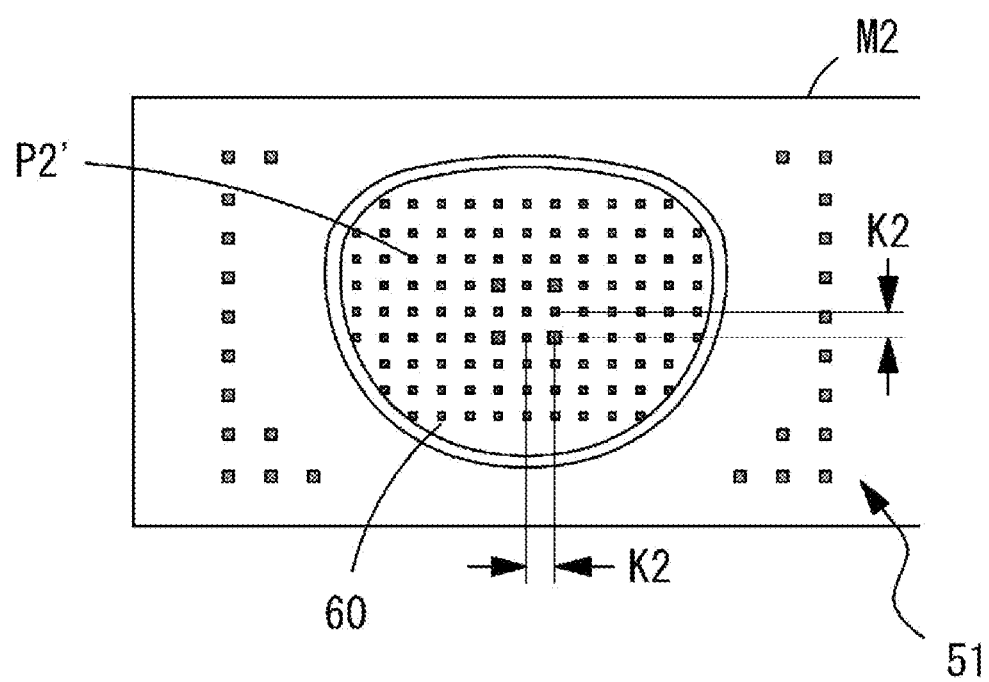
FIG. 5B is an example of a captured image obtained by displaying a second index pattern in a case where the eyeglasses are placed on the eyeglasses support unit.

FIGS. 4A and 4B are examples of captured images obtained by displaying the first index pattern 30a on the first transmissive display 24a. FIG. 4A shows a state where the eyeglasses F are not placed on the eyeglasses support unit 10. FIG. 4B shows a state where the eyeglasses F are placed on the eyeglasses support unit 10. FIGS. 5A and 5B are examples of captured images obtained by displaying the second index pattern 30b on the second transmissive display 24b. FIG. 5A shows a state where the eyeglasses F are not placed on the eyeglasses support unit 10. FIG. 5B shows a state where the eyeglasses F are placed on the eyeglasses support unit 10.

In FIGS. 4A, 4B, 5A, and 5B, a case where the lens LE of the eyeglasses F is the minus lens is taken as an example, and the captured image with respect to the right lens LEr of the eyeglasses F is shown. Further, in FIGS. 4A, 4B, 5A, and 5B, the shape of the first index pattern 30a and the shape of the second index pattern 30b are shown as different shapes, for convenience of explanation.

First, a reference state where the eyeglasses F are not placed on the eyeglasses support unit 10 will be described. In a case where the first index pattern 30a is displayed on the first transmissive display 24a in the reference state, the measurement light flux from the light source 21 is formed in the shape of the first index pattern 30a. Therefore, as shown in FIG. 4A, as the captured image, the reference image B1 including the image of the first index pattern 30a (hereinafter referred to as the first index pattern image 41) is acquired. Further, in a case where the second index pattern 30b is displayed on the second transmissive display 24b in the reference state, the measurement light flux from the light source 21 is formed in the shape of the second index pattern 30b. Therefore, as shown in FIG. 5A, as the captured image, the reference image B2 including the image of the second index pattern 30b (hereinafter referred to as the second index pattern image 51) is acquired.

In the present example, the positions and the number of the plurality of indexes 31 in the first index pattern 30a and the positions and the number of the plurality of indexes 31 in the second index pattern 30b are the same. Therefore, in the reference state, a pixel position of each index image in the reference image B1 and a pixel position of each index image in the reference image B2 are the same positions. As an example, the pixel position of a point P1, which corresponds to the index image which is the fourth from the left and the third from the top, in the first index pattern image 41, and the pixel position of a point P2, which corresponds to the index image which is the fourth from the left and the third from the top, in the second index pattern image 51 are the same position.

Next, the measurement state where the eyeglasses F are placed on the eyeglasses support unit 10 will be described. In a case where the first index pattern 30*a* is displayed on the first transmissive display 24*a* in the measurement state, the measurement light flux from the light source 21 is formed in the shape of the first index pattern 30*a*, and the measurement light flux from the light source 21 is refracted by the refraction power of the lens LE and diverges. Therefore, as shown in FIG. 4B, as the captured image, a measurement image M1, which includes the first index pattern image 41 of which at least a part is reduced to a circular shape from the reference state and the image of the right lens LEr (hereinafter, right lens image 60), is acquired. Further, in a case where the second index pattern 30*b* is displayed on the second transmissive display 24*b* in the measurement state, the measurement light flux from the light source 21 is formed in the shape of the second index pattern 30*b*, and the measurement light flux from the light source 21 is refracted by the refraction power of the lens LE and diverges. Therefore, as shown in FIG. 5B, as the captured image, the measurement image M2, which includes the second index pattern image 51 of which at least a part is reduced to a circular shape from the reference state and the right lens image 60, is acquired.

In the present example, each transmissive display is disposed such that the distance from the lens LE to the second transmissive display 24*b* is farther than the distance from the lens LE to the first transmissive display 24*a*. Therefore, in the measurement state, the second index pattern image 51 in the measurement image M2 appears as a smaller image than the first index pattern image 41 in the measurement image M1, and the pixel positions of each index image in the measurement image M1 and the pixel positions of each index image in the measurement image M2 are different positions. As an example, the pixel position of the point P1', which corresponds to the index image which is the fourth from the left and the third from the top in the first index pattern image 41, and the pixel position of the point P2', which corresponds to the index image which is the fourth from the left and the third from the top in the second index pattern image 51, are different positions.

For example, in the above description, the lens LE of the eyeglasses F is the minus lens. However, in a case where the lens LE is the plus lens, the measurement light flux from the light source 21 is refracted by the refraction power of the lens LE and converges. Therefore, in the measurement state, the first index pattern image 41 and the second index pattern image 51 of which at least a part is enlarged in a circular shape from the reference state are acquired. The second index pattern image 51 in the measurement image M2 appears as a larger image than the first index pattern image 41 in the measurement image M1. Further, in a case where the lens LE is an astigmatism lens, the first index pattern image 41 and the second index pattern image 51 of which at least a part is deformed to an elliptical shape from the reference state are acquired. Further, in a case where the lens LE is a progressive lens, the first index pattern image 41 and the second index pattern image 51 that is deformed according to the refraction power of a progressive band are acquired.

<Controller>

Figure 6:
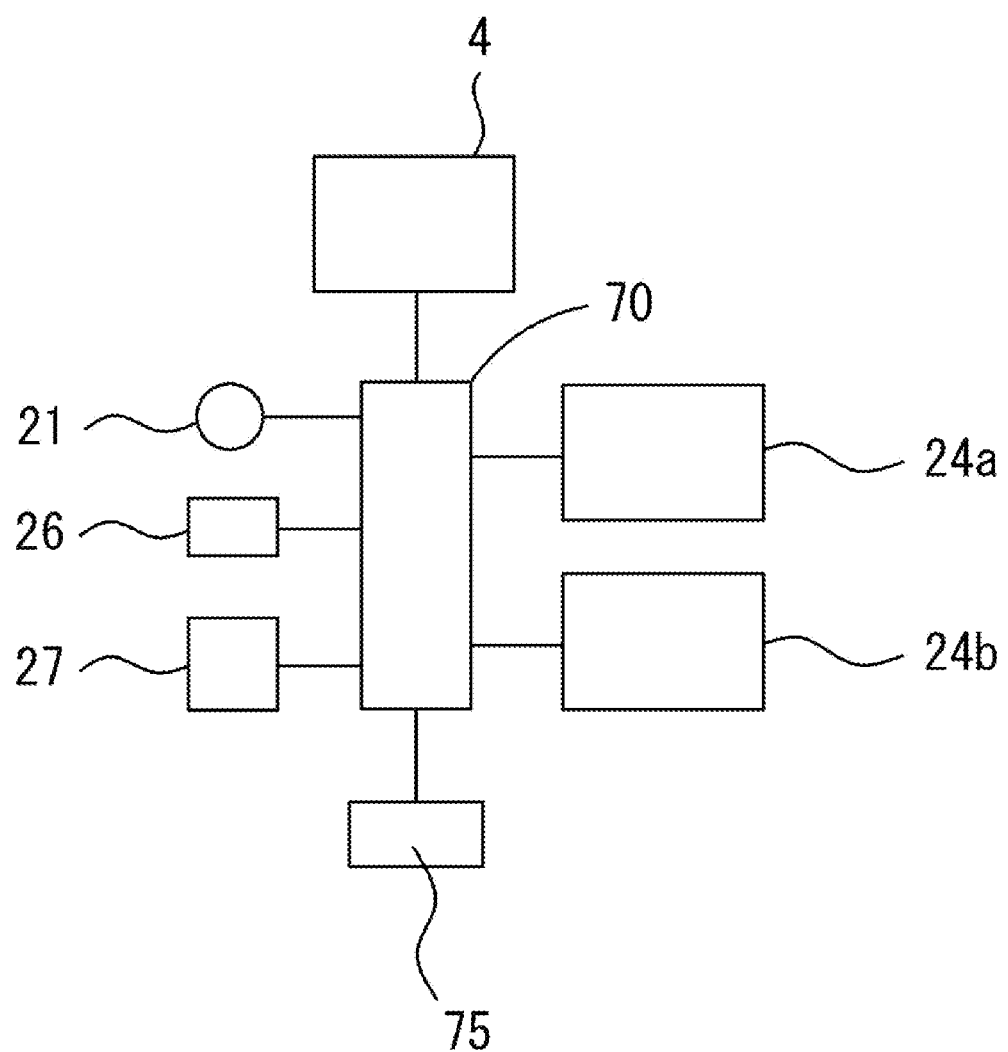
FIG. 6 is a diagram showing a control system of a measurement device.

FIG. 6 is a diagram showing a control system of the measurement device 1. For example, the controller 70 is electrically connected to the monitor 4, the light source 21, the drive mechanism 26, the imaging element 27, the first transmissive display 24*a*, the second transmissive display 24*b*, a non-volatile memory 75 (hereinafter, memory 75), and the like.

For example, the controller 70 is realized by a general CPU (processor), a RAM, a ROM, and the like. For example, the CPU controls a driving of each part in the measurement device 1. For example, the RAM temporarily stores various types of information. For example, the ROM stores various programs executed by the CPU. The controller 70 may be including a plurality of controllers (that is, a plurality of processors).

The memory 75 may be a non-transient storage medium capable of holding storage contents even in a case where the power supply is cut off. For example, as the memory 75, a hard disk drive, a flash ROM, a USB memory, or the like can be used. For example, the memory 75 stores the reference image B1 and the reference image B2 in the reference state, the measurement images M1 and M2 in the measurement state, and the like.

<Control Operation>

A control operation of the measurement device 1 will be described.

The operator receives the wearer's eyeglasses F and places the eyeglasses F on the eyeglasses support unit 10. Further, the operator moves at least any of the front support portion 12, the rear support portion 13, and the positioning pin 11 to complete an alignment between the eyeglasses F and the measurement optical system 20.

Subsequently, the operator sets any of an optical characteristic measurement mode for acquiring the optical characteristic of the lens LE of the eyeglasses F, and a lens information acquisition mode for acquiring lens information different from the optical characteristic. The operator operates the monitor 4 to select a mode setting button which is not shown. The controller 70 sets any of the optical characteristic measurement mode and the lens information acquisition mode according to the input signal from the monitor 4.

<Acquisition of Optical Characteristic of Lens>

Hereinafter, the optical characteristic measurement mode will be described in detail. In the optical characteristic measurement mode, the first transmissive display 24*a* and the second transmissive display 24*b* are displayed, and the first index pattern 30*a* and the second index pattern 30*b* are projected onto the lens LE to acquire the optical characteristic of the lens LE. In the present example, the second transmissive display 24*b* is not displayed in a case where the first transmissive display 24*a* is displayed, and the second transmissive display 24*b* is displayed in a case where the first transmissive display 24*a* is not displayed, and the first index pattern 30*a* and the second index pattern 30*b* are sequentially projected onto the lens LE to acquire the optical characteristic of the lens LE.

In a case where the optical characteristic measurement mode is set, the controller 70 turns on the light source 21. Further, the controller 70 causes the first transmissive display 24*a* to display the predetermined first index pattern 30*a*. The second transmissive display 24*b* is not displayed, and the predetermined second index pattern 30*b* is not displayed. The measurement light flux from the light source 21 is diverged, shaped in parallel by the collimator lens 23, and emitted to the left lens LEl and the right lens LEr at the same time. Further, the measurement light flux from the light source 21 is refracted by each of the left lens LEl and the right lens LEr, is formed in the shape of the first index pattern 30*a* by passing through the first transmissive display 24a, passes by the second transmissive display 24b, is reflected in the original direction by the retroreflective member 25, and reaches the imaging element 27. The controller 70 acquires the measurement image M1 including the first index pattern image 41, the left lens image, and the right lens image 60, based on an imaging result of the imaging element 27. Further, the controller 70 stores the measurement image M1 in the memory 75.

Subsequently, the controller 70 causes not to display the first transmissive display 24a and causes the second transmissive display 24b to display the predetermined second index pattern 30b. Therefore, the measurement light flux from the light source 21 is refracted by each of the left lens LEl and the right lens LEr, passes by the first transmissive display 24a, is formed in the shape of the second index pattern 30b by passing through the second transmissive display 24b, is reflected in the original direction by the retroreflective member 25, and reaching the imaging element 27. The controller 70 acquires the measurement image M2 including the second index pattern image 51, the left lens image, and the right lens image 60, based on the imaging result of the imaging element 27. Further, the controller 70 stores the measurement image M2 in the memory 75.

The controller 70 acquires the optical characteristic of each of the left lens LEl and the right lens LEr, based on the measurement image M1 and the measurement image M2. For example, the controller 70 acquires the optical characteristic of each of the left lens LEl and the right lens LEr, based on the amount of change in the interval of the respective index images forming the first index pattern image 41 and the second index pattern image 51.

Figure 7:
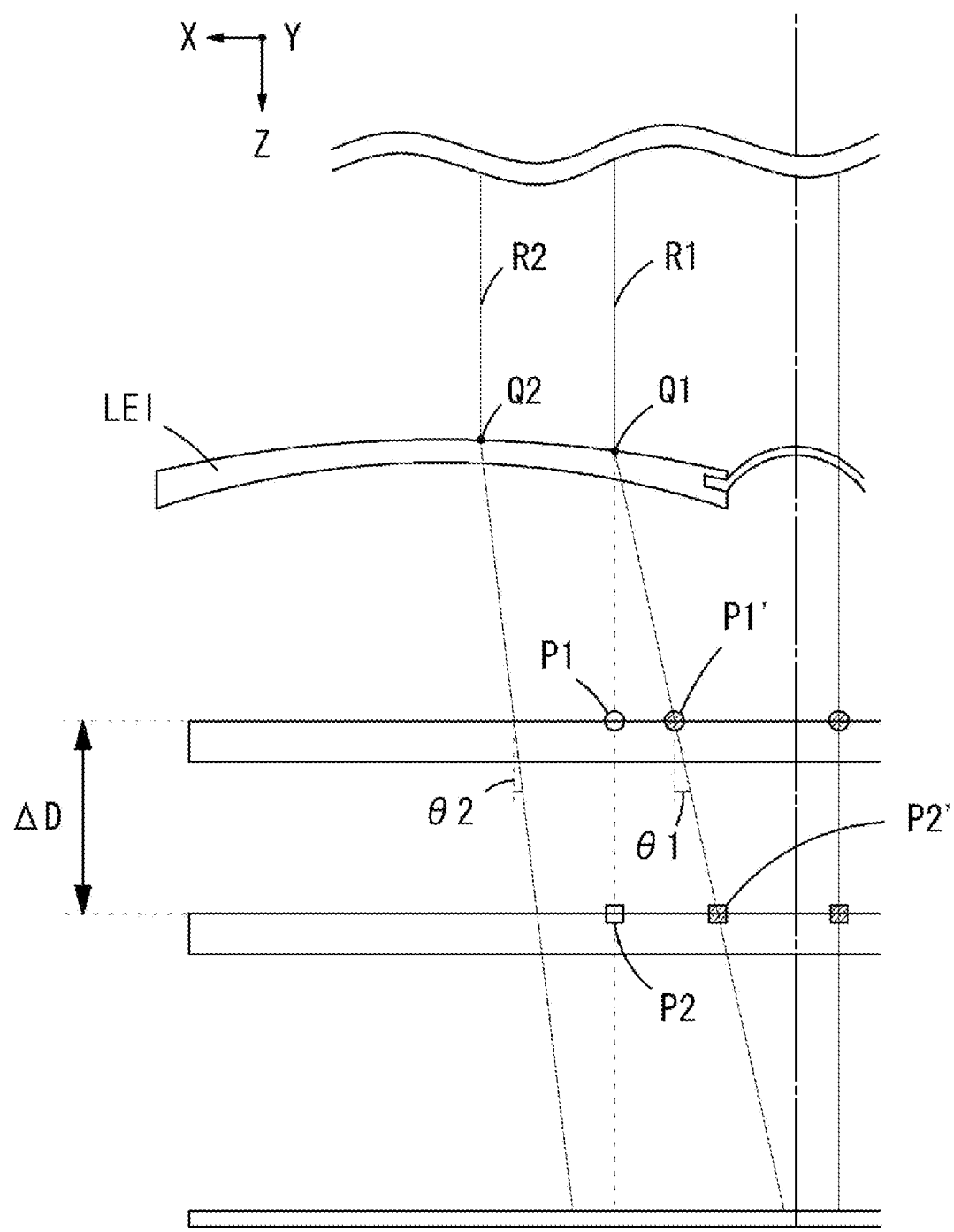
FIG. 7 is a schematic view showing a measurement light flux from a light source.

FIG. 7 is a schematic view showing the measurement light flux from the light source 21. For example, the measurement light flux (light ray R1) from the light source 21 is refracted by passing through a position of a point Q1 in the lens LE. The position of the point Q1 in the lens LE in the XY direction can be obtained based on any of the reference image B1 and the reference image B2, since the position of the point Q1 in the lens LE in the XY direction corresponds to the pixel position of the predetermined index image in the reference image B1 (for example, the pixel position of the point P1) and the pixel position of the predetermined index image in the reference image B2 (for example, the pixel position of point P2).

The controller 70 detects where the index image of the reference image B1 in the reference state has moved to the measurement image M1 in a case where the eyeglasses F are placed to be the measurement state. For example, the controller 70 detects the pixel position of each index image forming the first index pattern image 41, for the measurement image M1. Further, for example, the controller 70 compares the pixel position of each index image in the measurement image M1 with the pixel position of each index image in the reference image B1. Therefore, for example, it is detected that the light ray R1 passes through the first transmissive display 24a and the point P1 of the reference image B1 is moved to a point P1' of the measurement image M1.

Similarly, the controller 70 detects where the index image of the reference image B2 in the reference state has moved to the measurement image M2 in a case where the eyeglasses F are placed to be the measurement state. For example, the controller 70 detects the pixel position of each index image forming the second index pattern image 51 for the measurement image M2 and compares the pixel position of each index image forming the second index pattern image 51 with the pixel position of each index image in the reference image B2. Therefore, for example, it is detected that the light ray R1 passes through the second transmissive display 24b and the point P2 of the reference image B2 is moved to a point P2' of the measurement image M2.

Next, the controller 70 calculates the refraction angle θ at which the light ray R1 from the light source 21 is refracted by the lens LE. For example, the refraction angle θ of the light ray R1 can be calculated from a triangular function using the distance ΔD from the first transmissive display 24a to the second transmissive display 24b, the position of the point P1' in the XY direction in which the light ray R1 has passed through the first transmissive display 24a, and the position of the point P2' in the XY direction in which the light ray R1 has passed through the second transmissive display 24b.

The controller 70 calculates respective refraction angles (that is, the angle θ1 and the angle θ2) as described above, at which the measurement light flux from the light source 21 is refracted by passing through the positions of at least two points on the lens LE (in the present example, two points of the point Q1 and the point Q2 different from the point Q1). Further, the controller 70 calculates a position of a focal length f of the lens LE and a position of an optical center O of the lens LE, based on the positions of at least two points on the lens LE. For example, the position of the focal length f of the lens LE and the position of the optical center O of the lens LE can be obtained by the following formulas.

$$f = \frac{Q1 - Q2}{\tan\theta 1 - \tan\theta 2} \quad \text{[Math. 1]}$$

$$O = f\tan\theta 1 + Q1 \quad \text{[Math. 2]}$$

The position of the optical center O of the lens LE can also be obtained by using the position of the point Q2 at which the light ray R2 passes through the lens LE and the refraction angle θ2 at which the light ray R2 is refracted by the lens LE.

Figure 8:
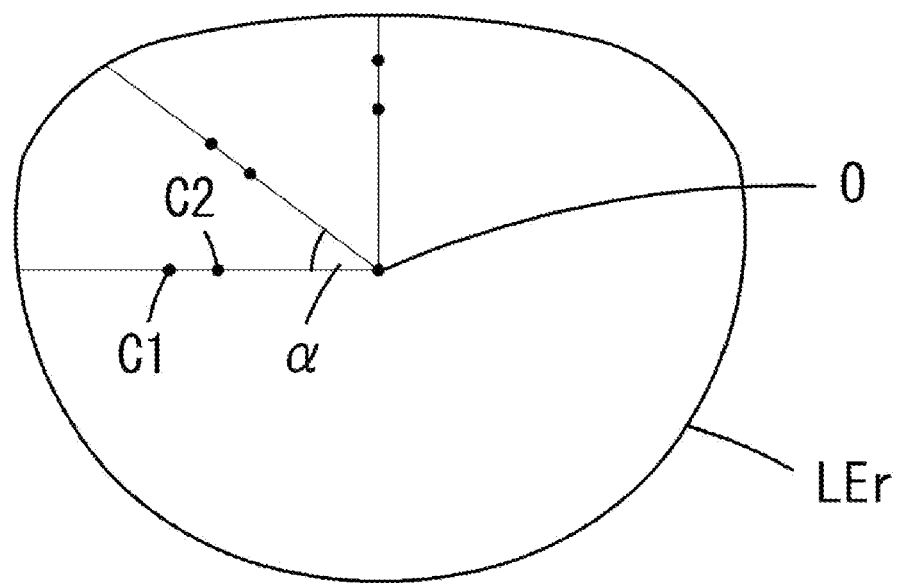
FIG. 8 is a view showing a meridian direction of a lens.

FIG. 8 is a view showing a meridian direction of the lens LE. The controller 70 sets arbitrary two points (points C1 and C2 in FIG. 8), at positions separated, in a predetermined meridian direction, by a predetermined distance from the position of the optical center O of the lens LE. For example, the controller 70 sets the predetermined meridian direction for each predetermined angle α. That is, in a case where the predetermined angle α is 45 degrees, respective meridian directions are set to 0 degrees, 45 degrees, 90 degrees, . . . , 315 degrees. Further, for example, the controller 70 sets a predetermined distance such that the distance from the optical center O to the point C1 is the same in each meridian direction. Further, for example, the controller 70 sets a predetermined distance such that the distance from the optical center O to the point C2 is the same in each meridian direction.

Subsequently, the controller 70 calculates the position of the focal length f in each meridian direction from arbitrary two points in each meridian direction, and obtains the refraction power E of the lens LE in each meridian direction. The refraction power E of the lens LE is represented as a reciprocal of the focal length f. Further, the controller 70 creates a graph in which the refraction power E of the lens LE is plotted on the vertical axis and the predetermined angle α is plotted on the horizontal axis, and obtains an approximate curve using a least squares method. For example, such an approximate curve has the following equation. Note that a, b, and c in the equation are constants.

$$E(t)=a \sin \{2(t-b)\}+c \qquad \text{[Math. 3]}$$

The controller 70 acquires the optical characteristic of the lens LE (for example, spherical degree, cylindrical degree, astigmatic axis angle, or the like) based on the approximate curve. Further, the controller 70 causes the monitor 4 to display the optical characteristic of the lens LE.

The controller 70 may acquire the distribution of the optical characteristic of the lens LE by repeating the calculation of the refraction angle and the refraction power of the light rays described above, at a plurality of positions other than the position of the optical center O of the lens LE. The controller 70 may display a map image indicating the distribution of the optical characteristic of the lens LE on the monitor 4. For example, the map image may be presented together with the image of the eyeglasses frame by superimposing the left lens image and the right lens image 60 in the measurement image M1 or the measurement image M2. By confirming these information, the operator can grasp the optical characteristic of lens LE and the distribution of the optical characteristic of the lens LE.

<Acquisition of Lens Information of Lens>

Hereinafter, the lens information acquisition mode will be described in detail. In the lens information acquisition mode, the lens information of the lens LE is acquired by not displaying the first transmissive display 24a and the second transmissive display 24b. Here, a case where the hidden mark of the lens LE is detected as the lens information of the lens LE will be taken as an example.

In a case where the lens information acquisition mode is set, the controller 70 turns on the light source 21. Further, the controller 70 causes not to display the first transmissive display 24a and the second transmissive display 24b. Further, the controller 70 drives the drive mechanism 26 to rotate the retroreflective member 25 at high speed. The measurement light flux from the light source 21 is diverged, shaped in parallel by the collimator lens 23, and emitted to the left lens LEl and the right lens LEr at the same time. Further, the measurement light flux from the light source 21 is refracted by each of the left lens LEl and the right lens LEr, passes by the first transmissive display 24a and the second transmissive display 24b, is reflected in the original direction by the retroreflective member 25, and reaches the imaging element 27. The controller 70 processes an electric signal based on the image pickup result of the imaging element 27 and acquires the measurement image M3.

Figure 9:
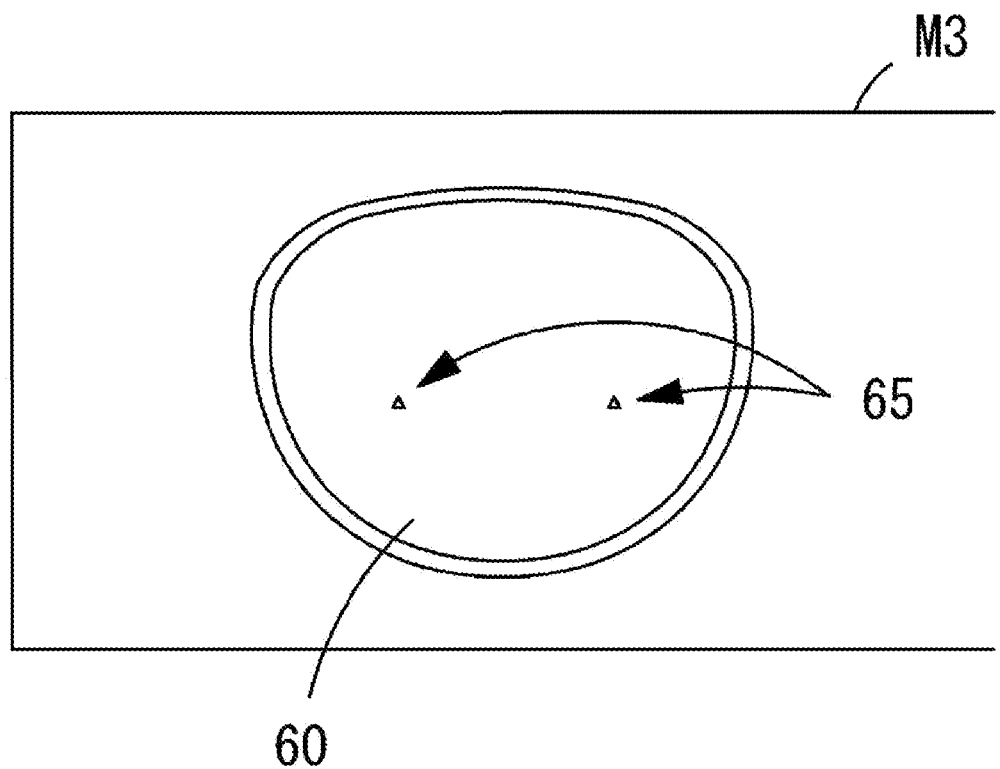
FIG. 9 is an example of a measurement image.

FIG. 9 is an example of the measurement image M3. For example, the measurement image M3 is acquired as the image including the left lens image and the right lens image 60. In the present example, the measurement light flux from the light source 21 is reflected by the retroreflective member 25 to illuminate the rear surfaces of the left lens LEl and the right lens LEr. Therefore, it is possible to obtain a measurement image M3 in which the contrast is high and clearly showing the lens image (left lens image and right lens image 60), the hidden mark image 65, which is described later, and the like clearly appear.

The controller 70 detects an edge from a rising and falling of the luminance in the measurement image M3, and detects the hidden mark image 65. Further, the controller 70 causes the monitor 4 to display the hidden mark image 65 of the lens LE. By confirming the hidden mark image 65, the operator can grasp the refraction rate, the addition degree, the progressive band length, and the like of the lens LE.

In the present example, a configuration in which the operator manually sets any of the optical characteristic measurement mode and the lens information acquisition mode is described as an example. However, the present invention is not limited to this. Of course, the controller 70 may be configured to automatically set any of the optical characteristic measurement mode and the lens information acquisition mode. As an example, the controller 70 may set the lens information acquisition mode based on the type of the lens LE.

The controller 70 acquires the measurement image M1 including the first index pattern image 41, and determines the type of the lens LE based on the change in the interval of the respective index images forming the first index pattern image 41. For example, in a case where the lens LE is the spherical lens (minus lens or plus lens) or the astigmatism lens, the interval of the respective index images forming the first index pattern image 41 is enlarged or reduced at a constant rate. Therefore, the controller 70 can determine that the lens LE is the spherical lens or the astigmatism lens in a case where the distance K1 of the interval of the index image detected in the measurement image M1 is equidistant (substantially equidistant). Further, for example, in a case where the lens LE is the progressive lens, the interval of the respective index images forming the first index pattern image 41 becomes narrower from a far point to a near point according to the refraction power of the progressive band. Therefore, the controller 70 can determine that the lens LE is the progressive lens in a case where the distance K1 of the interval of the index image detected in the measurement image M1 gradually becomes narrower (or wider). For example, in a case where the controller 70 determines that the lens LE is the progressive lens, the controller 70 may set the lens information acquisition mode to detect the hidden mark image 65 of the lens LE.

<Change of Index Interval>

In a case where the optical characteristic of the lens LE is acquired, the interval of the respective index images forming the index pattern image greatly changes depending on the refraction power of the lens LE. In particular, the higher the power of the lens LE becomes, the stronger the refraction power of the lens LE becomes, and thus, the interval of the index image significantly changes.

As an example, as the lens LE is the minus lens and has the high power, each index image is reduced to a circular shape, and the interval of the index image becomes narrower. In this case, in the measurement image, since adjacent index images may overlap or adjacent index images may intersect, it becomes difficult to distinguish the adjacent index images from each other. For example, in a case where the optical characteristic of the lens LE is measured in such a state, it is not possible to accurately obtain the position information where the measurement light flux from the light source passes through the transmissive display, and it is difficult to maintain a constant measurement accuracy.

Further, as an example, as the lens LE is the plus lens and has the high degree, each index image is enlarged in a circular shape, and the interval of the index image becomes wider. In this case, a sufficient number of index images may not be obtained in the measurement image. For example, in a case where the optical characteristic of the lens LE is measured in such a state, the position information where the measurement light flux from the light source passes through the transmissive display is insufficient, and it is difficult to maintain a constant measurement accuracy.

Therefore, in the present example, the interval of the respective index images in the measurement image is detected, and the application of the voltage to a specific segment provided in the transmissive display is controlled based on the detection result of the interval of the respective index images. Therefore, the interval of the index 31 can be changed according to the lens LE, and an appropriate index pattern can be expressed.

Hereinafter, the change of the interval of the index 31 will be described in detail by taking a case where the lens LE of the eyeglasses F is the minus lens as an example. For example, in the present example, the controller 70 automatically sets any mode of a normal mode in which the plurality of indexes 31 are displayed on the first transmissive display and the second transmissive display at predetermined intervals, and a wide interval mode in which the plurality of indexes 31 are displayed on the first transmissive display and the second transmissive display at intervals wider than the predetermined intervals.

<Normal Mode>

Hereinafter, the normal mode will be described in detail. In a case where the controller 70 measures the optical characteristic of the lens LE, first, the controller 70 sets the normal mode. For example, in the normal mode, the voltage is applied to every other segment displaying the plurality of indexes 31, and the first index pattern 30a in which the interval of the plurality of indexes 31 is the predetermined distance S1 (see FIG. 3A) is displayed on the first transmissive display 24a. At this time, the measurement image M1 including the first index pattern image 41, in which the interval of the respective index images (hereinafter referred to as the first index image) is reduced due to the refraction power of the lens LE, is acquired. For example, the controller 70 analyzes the measurement image M1 to detect the pixel position of the first index image, and calculates the distance K1 of the interval of the first index image (FIG. 4B) based on the pixel position of the adjacent first index image.

The controller 70 determines whether the distance K1 of the interval of the first index image exceeds the distance which is set as a predetermined threshold value. For example, the controller 70 determines that the distance K1 is less than the threshold value in a case where the distance K1 of the interval of the first index image is longer than the predetermined threshold value. Further, the controller 70 determines that the distance K1 exceeds the threshold value in a case where the distance K1 of the interval of the first index image is shorter than the predetermined threshold value. The predetermined threshold value may be stored in the memory 75, in advance, based on experiments, simulations, or the like.

In a case where the controller 70 determines that the distance K1 of the interval of the first index image is less than the threshold value, the controller 70 stores the measurement image M1 including the first index pattern image 41, in which the interval of the first index image is the distance K1, in the memory 75. Subsequently, the controller 70 applies the voltage to every other segment displaying the plurality of indexes 31, and causes the second transmissive display 24b to display the second index pattern 30b in which the interval of the plurality of indexes 31 is the predetermined distance 51. Therefore, the measurement image M2 including the second index pattern image 51, in which the interval of the respective index images (hereinafter referred to as the second index image) is the distance K2, is acquired and stored in the memory 75. The controller 70 acquires the optical characteristic of the lens LE based on the measurement images M1 and the measurement images M2.

<Wide Interval Mode>

Hereinafter, a wide interval mode will be described in detail. For example, the wide interval mode is set in a case where it is determined, in the above-mentioned normal mode, that the distance K1 of the interval of the first index image exceeds the threshold value. For example, in the wide interval mode, the voltage is applied to all the segments displaying the plurality of indexes 31, and the first index pattern 30a in which the interval of the plurality of indexes 31 is a distance longer than the predetermined distance S1 is displayed on the first transmissive display 24a.

For example, in a case where the controller 70 determines that the distance K1 of the interval of the first index image exceeds the threshold value, the controller 70 changes the application of the voltage to each segment displaying the plurality of indexes 31 on the first transmissive display 24a, and applies the voltage to all segments displaying the plurality of indexes 31. Therefore, for example, the first index pattern 30a (see FIG. 3C), in which the interval of the plurality of indexes 31 is a distance S3, which is longer than the predetermined distance S1, is displayed on the first transmissive display 24a. At this time, due to the refraction power of the lens LE, the measurement image M1 including the first index pattern image 41 in which the interval of the first index image is longer than the distance K1 is acquired. The controller 70 stores the measurement image M1 in the memory 75.

Subsequently, the controller 70 applies the voltage to all the segments displaying the plurality of indexes 31, and causes the second transmissive display 24b to display the second index pattern 30b in which the interval of the plurality of indexes 31 is the distance S3, which is longer than the predetermined distance S1. Therefore, the measurement image M2 including the second index pattern image 51, in which the interval of the second index image is longer than the distance K2, is acquired. The controller 70 stores the measurement image M2 in the memory 75.

In this way, the controller 70 acquires appropriate measurement image M1 and measurement image M2 by changing the interval of the plurality of indexes 31 according to the lens LE, and acquires the optical characteristic of the lens LE based on these measurement images.

In the above description, a configuration in which the wide interval mode is set in a case where it is determined that the distance K1 of the interval of the first index image exceeds the threshold value is described as an example. However, the present invention is not limited to this. For example, the wide interval mode may be set in a case where the distance K1 of the interval of the first index image is not detected due to the overlap of the first index images or the like.

Further, in the above description, a configuration is described as an example, in which the first index pattern 30a, in which the interval of the plurality of indexes 31 is the predetermined distance 51, is displayed on the first transmissive display 24a, and the normal mode is automatically switched to the wide interval mode based on whether the distance K1 of the interval of the first index image detected at this time exceeds the threshold value. However, the present invention is not limited to this. Of course, a configuration may be provided, in which the second index pattern 30b, in which the interval of the plurality of indexes 31 is the predetermined distance S1, is displayed on the second transmissive display 24b, and the normal mode is automatically switched to the wide interval mode based on whether the distance K2 of the interval of the second index images detected at this time exceeds the preset threshold value. For example, in a case where the measurement image M1 is acquired in the normal mode and then the measurement image M2 is acquired in the wide interval mode, the measurement image M1 may be acquired again in the wide interval mode.

As described above, for example, the eyeglasses lens measurement device in the present example includes the transmissive display that transmits the measurement light flux from the light source and is capable of displaying the index pattern formed by arranging the plurality of indexes, acquires the optical characteristic of the eyeglasses lens by displaying the index pattern on the transmissive display, and acquires the lens information of the eyeglasses lens (as an example, hidden mark information) by not displaying at least a part of the index pattern on the transmissive display. Therefore, for example, the optical characteristic and the lens information of the eyeglasses lens can be acquired with a simple configuration without individually providing each optical system for obtaining the optical characteristic or the lens information, or requiring complicated control.

Further, for example, the eyeglasses lens measurement device in the present example includes a first transmissive display that is capable of displaying the first index pattern, and a second transmissive display that is capable of displaying the second index pattern and is disposed at a different position from the first transmissive display in the optical axis direction, and the detector detects the measurement light flux transmitted through the first transmissive display and further transmitted through the second transmissive display. For example, by providing the transmissive display at a different position in the optical axis direction, the optical characteristic of the eyeglasses lens can be accurately acquired with a simple configuration without providing a mechanism for moving the eyeglasses lens or the transmissive display in the optical axis direction. More specifically, the refraction angle in which the measurement light flux from the light source is refracted by the refraction power of the eyeglasses lens can be obtained, and the optical characteristic of the eyeglasses lens can be accurately acquired based on this.

Further, for example, in the eyeglasses lens measurement device of the present example, at least a part of the second index pattern is not displayed in a case where the first index pattern is displayed, and the second index pattern is displayed in a case where at least a part of the first index pattern is not displayed, in the first transmissive display capable of displaying the first index pattern and the second transmissive display capable of displaying the second index pattern. Therefore, the first index pattern image and the second index pattern image do not overlap, and the position of each index pattern image (index image) can be accurately detected, and thus, the optical characteristic can be accurately measured.

Further, for example, the eyeglasses lens measurement device in the present example includes the retroreflective member that is capable of illuminating the eyeglasses lens by reflecting back the measurement light flux, which emitted toward the eyeglasses lens from the light source and passing through the eyeglasses lens and the transmissive display, in the incident direction, and the detector detects the reflected light flux which is the measurement light flux reflected by the retroreflective member from the light source. Therefore, the eyeglasses lens image and the index pattern image (index image) projected onto the eyeglasses lens can be obtained in a state of high contrast, and the detection accuracy of these images can be improved.

Further, for example, the eyeglasses lens measurement device in the present example switches between the first mode for acquiring the optical characteristic of the eyeglasses lens and the second mode for acquiring the lens information of the eyeglasses lens. Therefore, for example, an appropriate mode can be applied according to the eyeglasses lens, and the optical characteristic and the lens information of the eyeglasses lens can be easily acquired.

Further, the eyeglasses lens measurement device in the present example emits the measurement light flux toward both the left lens and the right lens as the eyeglasses lens from the light source, and detects, by the detector, the measurement light flux passing through the left lens and the transmissive display and the measurement light flux passing through the right lens and the transmissive display. Therefore, the measurement optical system has a simple configuration, and the optical characteristic and the lens information of the eyeglasses lens can be acquired by simple control. For example, in a case of the configuration in which the measurement light flux is emitted toward both the left lens and the right lens as the eyeglasses lens at the same time, it may not be necessary to provide a mechanism for moving the eyeglasses lens, which is necessary in the configuration in which with the measurement light flux is sequentially emitted toward the left lens and the right lens. Therefore, the optical characteristic and the lens information of the eyeglasses lens can be acquired by the measurement optical system with a simpler configuration and simpler control.

Further, for example, the eyeglasses lens measurement device in the present example is configured to set the interval of the plurality of indexes to any interval, and causes the transmissive display to display the index pattern formed by arranging the plurality of indexes having any interval. Therefore, an appropriate index pattern image corresponding to the eyeglasses lens can be obtained, and the optical characteristic can be accurately acquired. Further, the optical characteristic can be accurately acquired even in a case where a wide range of the optical characteristic of the eyeglasses lens is measured or even in a case where the distribution of the optical characteristic of the eyeglasses lens is acquired.

Further, for example, in the eyeglasses lens measurement device of the present example sets the interval of the index forming the index pattern based on the detection result of the detector that detects the measurement light flux from the light source. Therefore, the interval of the index is automatically set, and an appropriate index pattern image according to the eyeglasses lens can be easily acquired.

Further, for example, the eyeglasses lens measurement device in the present example detects the index pattern image in which the index is projected onto the eyeglasses lens, and sets the interval of the plurality of indexes forming the index pattern, based on the detection result of the index pattern image. For example, therefore, the interval of the index according to the eyeglasses lens can be appropriately set, based on the interval and the shape of the plurality of index images in the index pattern image projected onto the eyeglasses lens. Further, for example, therefore, an appropriate index pattern image according to the eyeglasses lens can be acquired, and the optical characteristic of the eyeglasses lens can be accurately acquired.

Further, for example, the eyeglasses lens measurement device in the present example sets the interval of the plurality of indexes forming the index pattern, based on whether the detection result of the detector exceeds the predetermined threshold value. Therefore, since the interval of the plurality of indexes can be automatically switched according to the eyeglasses lens, an appropriate index pattern image corresponding to the eyeglasses lens can be easily acquired, and the optical characteristic of the eyeglasses lens can be accurately acquired. Setting of the interval of such an index can be particularly effectively used in a fully automated device that automatically performs the measurement of the optical characteristic from the start to the completion thereof after the eyeglasses lens is placed.

Further, for example, the eyeglasses lens measurement device of the present example can set the first interval of the plurality of indexes forming the index pattern and the second interval of the plurality of indexes different from the first interval. Therefore, the interval of at least two indexes according to various eyeglasses lenses can be properly used.

Further, for example, the eyeglasses lens measurement device of the present example causes the transmissive display to display any of the first index pattern formed by the plurality of indexes having the first interval and the second index pattern formed by the plurality of indexes having the second interval, according to the switched mode. Therefore, for example, it is possible to deal with any eyeglasses lens of the eyeglasses lens in which the optical characteristic can be accurately acquired by projecting the index pattern having a predetermined index interval and the eyeglasses lens in which the optical characteristic is difficult to be accurately acquired by projecting the index pattern having the predetermined index interval.

Modified Examples

In the present example, a configuration in which the measurement optical system 20 is used to measure the optical characteristic and to detect the hidden mark image 65 with respect to of the lens LE framed in the eyeglasses frame is described as an example, but the present invention is not limited to this. For example, in the present example, a configuration in which the measurement optical system 20 may be used to measure the optical characteristic and to detect the hidden mark image 65 with respect to of the raw lens that is not framed in the eyeglasses frame may be provided. In this case, as the lens information of the raw lens, in addition to the hidden mark image formed on the raw lens, the mark point attached to the raw lens, the print mark attached to the raw lens, and the like may be detected.

In the present example, a configuration in which the optical characteristic of the lens LE is acquired by using the measurement optical system 20 including two transmissive displays (first transmissive display 24a and second transmissive display 24b) disposed at different positions in the optical axis direction is described as an example, but the present invention is not limited to this. For example, in the present example, a configuration in which the optical characteristic of the lens LE may be acquired by using a measurement optical system in which one transmissive display is disposed at a predetermined position in the optical axis direction may be provided.

Figure 10:
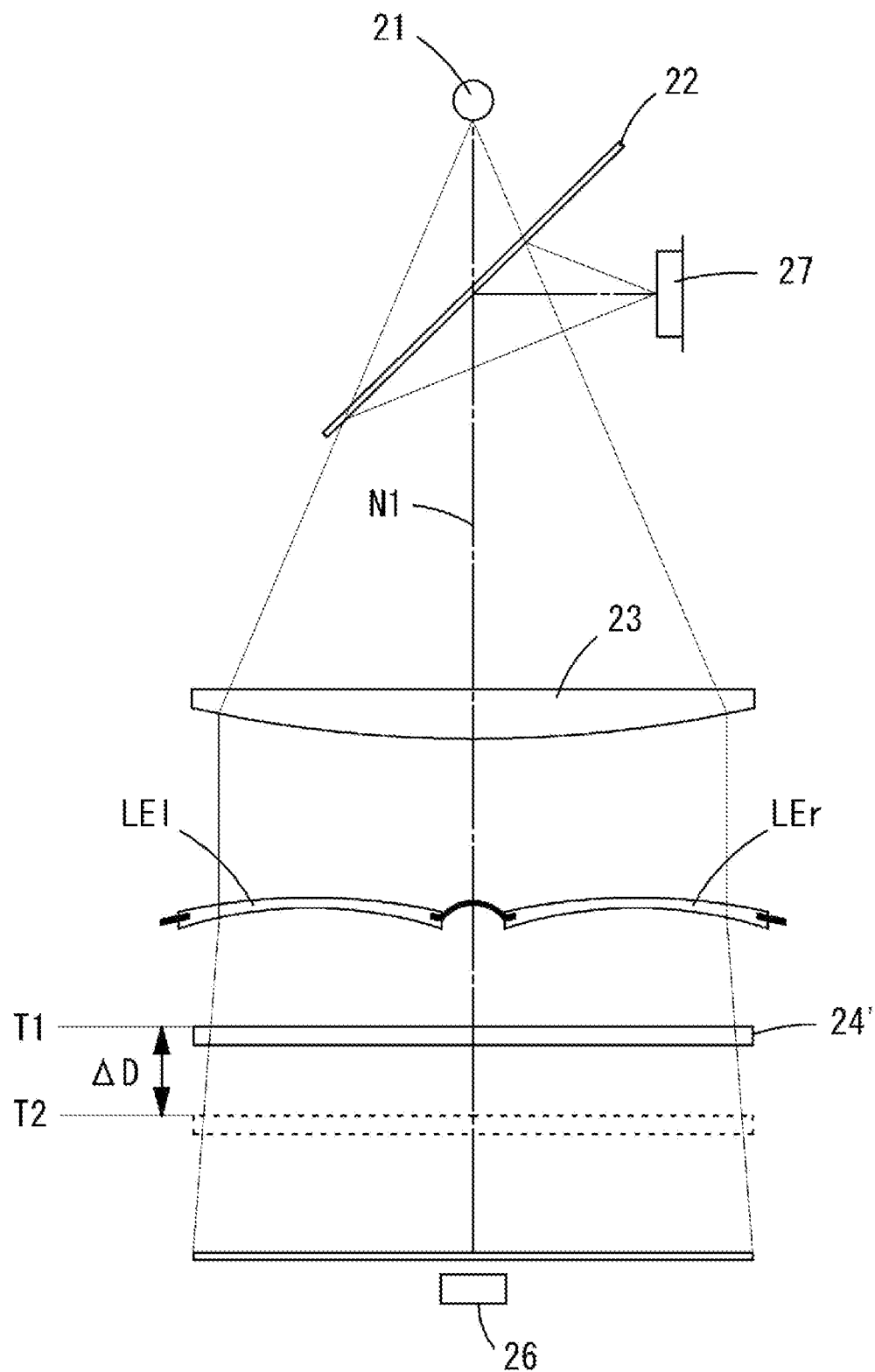
FIG. 10 is an example of a measurement optical system including a single transmissive display.

FIG. 10 is an example of the measurement optical system including one transmissive display. In a case where the measurement optical system includes one transmissive display, the moving mechanism 28 (for example, a motor or the like) for moving the transmissive display 24' in the optical axis N1 direction may be provided. Therefore, two measurement images having different distances from the lens LE to the transmissive display can be obtained, as in the case of using the two transmissive displays.

For example, the controller 70 causes the transmissive display 24' to display a predetermined index pattern, and disposes the transmissive display 24' at the initial position T1 near the lens LE. In this state, the measurement image at the initial position T1 including the index pattern image, the left lens image, and the right lens image is acquired. Further, for example, the controller 70 controls the moving mechanism 28 to move the transmissive display 24' by a distance ΔD while displaying the predetermined index pattern on the transmissive display 24', and disposes the transmissive display 24' at the moving position T2 far from the lens LE. In this state, the measurement image at the moving position T2 including the index pattern image, the left lens image, and the right lens image is acquired. Based on these measurement images, the controller 70 can acquire the optical characteristic of the lens LE by obtaining the position of the focal length f of the lens LE, the position of the optical center O of the lens LE, the refraction power E of the lens LE, and the like.

In the above description, the moving mechanism 28 for moving the transmissive display 24' in the optical axis N1 direction is provided, but a moving mechanism for moving the lens LE in the optical axis N1 direction may be provided. Since two measurement images having different distances from the lens LE to the transmissive display can be obtained, the optical characteristic of the lens LE can be acquired based on these measurement images.

Further, in the above description, the moving mechanism 28 for moving the transmissive display 24' in the optical axis N1 direction is provided, but a configuration in which the transmissive display 24' is not moved may be provided. In this case, the optical characteristic of the lens LE can be acquired based on the point in the XY direction in which the measurement light flux from the light source 21 has passed through the lens LE, the point in the XY direction in which the measurement light flux has passed through the transmissive display 24', and the distance from the lens LE to the transmissive display 24'. For example, the optical characteristic of the lens LE can be acquired by replacing the point P1' of the first transmissive display 24a in FIG. 7 with the point Q1 of the lens LE, replacing the distance ΔD from the first transmissive display 24a to the second transmissive display 24b with the distance from the lens LE to the second transmissive display 24b, and performing the same process.

In the present example, a configuration in which the optical path where the measurement light flux from the light source 21 is guided to the left lens LEl and the right lens LEr is a common optical path is described as an example, but the present invention is not limited to this. For example, in the present example, a configuration in which the optical path in which the measurement light flux from the light source is guided to the left lens LEl and the optical path in which the measurement light flux from the light source is guided to the right lens LEr is different optical paths may be provided.

Figure 11:
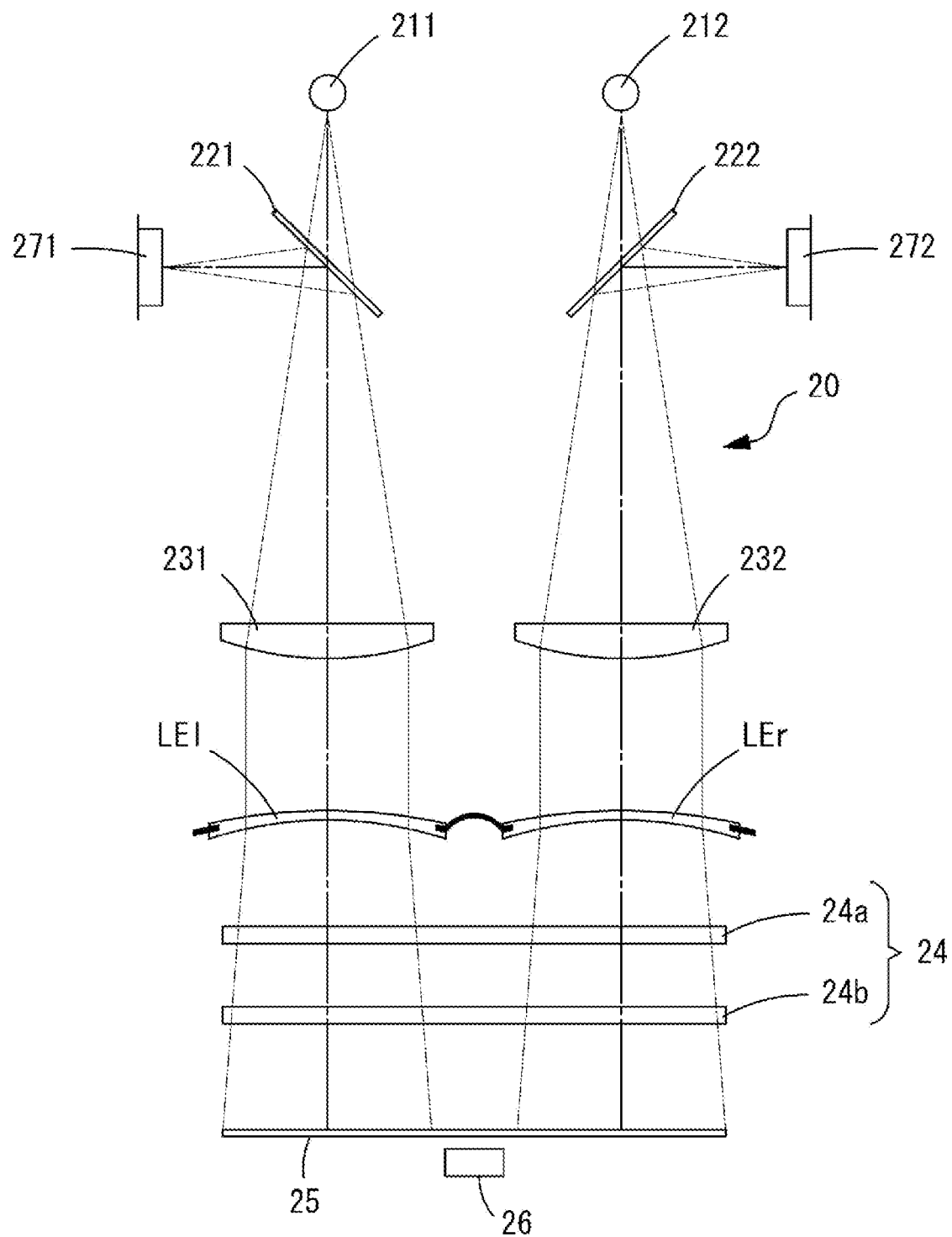
FIG. 11 is an example of a configuration where an optical path in which the measurement light flux is guided to a left lens and an optical path in which the measurement light flux is guided to a right lens are different optical paths.

FIG. 11 is an example of a configuration in which an optical path in which the measurement light flux from the light source is guided to the left lens LEl and the optical path in which the measurement light flux is guided to the right lens LEr are different optical paths. The measurement optical system may include a pair of left and right light sources (first light source 211 and second light source 212) and a pair of left and right imaging elements (first imaging element 271 and second imaging element 272). For example, the measurement light flux from the first light source 211 is emitted to the left lens LEl, and the measurement light flux passing through the left lens LEl and the transmissive display 24 and reflected by the retroreflective member 25 is imaged by the first imaging element 271. Further, for example, the measurement light flux from the second light source 212 is emitted to the right lens LEr, and the measurement light flux passing through the right lens LEr and the transmissive display 24 and reflected by the retroreflective member 25 is imaged by the second imaging element 272.

For example, as described above, in a case where the configuration includes the pair of left and right light sources, and a pair of left and right imaging elements, at least any of the collimator lens, the transmissive display 24, the retroreflective member 25, and the like may be disposed in each of the left and right optical paths, or may serve in both the left and right optical paths. As an example, as shown in FIG. 11, collimator lenses (collimator lens 231 and collimator lens 232) are disposed in the left and right optical paths, and the transmissive display 24 and the retroreflective member 25 may serve in both the left and right optical paths.

For example, by providing a pair of left and right light sources, and a pair of left and right collimator lenses, the measurement light flux from the light source 211 passes through the vicinity of the center of the collimator lens 231, and the measurement light flux from the light source 212 passes through the vicinity of the center of the collimator lens 232. Therefore, it is possible to reduce the aberration generated when the measurement light flux from the light source passes through the collimator lens and reduce the influence on the measurement accuracy. Further, since a collimator lens having a small diameter can be used, the measurement optical system can be constructed at low cost.

For example, by providing a pair of left and right imaging elements, the number of pixels of the detector can be effectively used for each of the left lens LEl and the right lens LEr, and the position of the index pattern image (index image) can be more accurately detected to improve the measurement accuracy of the optical characteristic. For example, in a case where the configuration includes a pair of left and right imaging elements, it is not necessary to distinguish between the measurement light flux passing through the left lens LEl and the measurement light flux passing through the right lens LEr, and thus, the optical characteristic and lens information of the lens LE can be acquired by simpler control.

In the above description, a configuration in which the measurement optical system 20 includes a pair of left and right light sources, and a pair of left and right imaging elements is described as an example, but the present invention is not limited to this. For example, one light source and a pair of left and right imaging elements may be provided. For example, in this case, the measurement light flux emitted from the light source is branched into the optical path for guiding to the left lens LEl and the optical path for guiding to the right lens LEr by the half mirror or the like, and the measurement light flux passing through each optical path may be imaged by the first imaging element 271 and the second imaging element 272. Further, for example, a pair of left and right light sources, and one imaging element may be provided. For example, in this case, the measurement light flux emitted from the light source 211 and guided to the left lens LEl, and the measurement light flux emitted from the light source 212 and guided to the right lens LEr are combined by the half mirror or the like, and may be imaged by the imaging element.

In the present example, a configuration in which the second transmissive display 24b is not displayed in a case where the first transmissive display 24a is displayed, and the second transmissive display 24b is displayed in a case where the first transmissive display 24a is not displayed, thereby acquiring the optical characteristic of the lens LE, is described as an example, but the present invention is not limited to this. For example, in the present example, a configuration in which the optical characteristic of the lens LE is acquired by displaying both the first transmissive display 24a and the second transmissive display 24b may be provided.

In this case, the measurement light flux from the light source 21 forms the first index pattern 40a by passing through the first transmissive display 24a, and further forms the second index pattern 40b by passing through the second transmissive display 24b, and thus, one measurement image including both the first index pattern image 41 and the second index pattern image 51 is acquired. The index 31 forming the first index pattern 40a and the index 31 forming the second index pattern 40b are set to at least any of a different shape, a different position, and a different number, and the first index pattern image 41 and the second index pattern image 51 in the measurement image may be easily distinguished.

For example, the controller 70 can obtain each of the measurement image M1 including the first index pattern image 41 and the measurement image M2 including the second index pattern image 51 by detecting each of the first index pattern image 41 and the second index pattern image 51 from one measurement image, the same as in a case where one of the two transmissive displays is displayed and the other is not displayed. Based on these measurement images, the controller 70 can acquire the optical characteristic of the lens LE by obtaining the position of the focal length f of the lens LE, the position of the optical center O of the lens LE, the refraction power E of the lens LE, and the like.

Further, in the present example, a configuration in which the hidden mark image 65 of the lens LE is detected by not displaying both the first transmissive display 24a and the second transmissive display 24b is described as an example, but the present invention is not limited to this. For example, in the present example, a configuration in which the hidden mark image 65 of the lens LE is detected by not displaying a part of the first transmissive display 24a and a part of the second transmissive display 24b may be provided. In this case, a part of each transmissive display may not be displayed so that the first index pattern image 41 and the second index pattern image 51 do not overlap with the hidden mark image 65. As an example, the controller 70 may detect the left lens image and the right lens image 60 from the measurement image, not display the index 31 corresponding to the index image located inside the left lens image and the right lens image 60, and detect the hidden mark image 65 of the lens LE.

In the present example, a configuration in which the hidden mark image 65 of the lens LE is detected by reflecting the measurement light flux from the light source 21 by the retroreflective member 25 and illuminating the lens LE is described as an example, but the present invention is not limited to this. For example, in the present example, a configuration may be provided in which, by using a display as the light source, the hidden mark image 65 of the lens LE is detected by illuminating the lens LE by turning on the display, and projecting an irradiation pattern on the lens LE by displaying an irradiation pattern different from the first index pattern 30a and the second index pattern 30b in the display.

Figure 12:
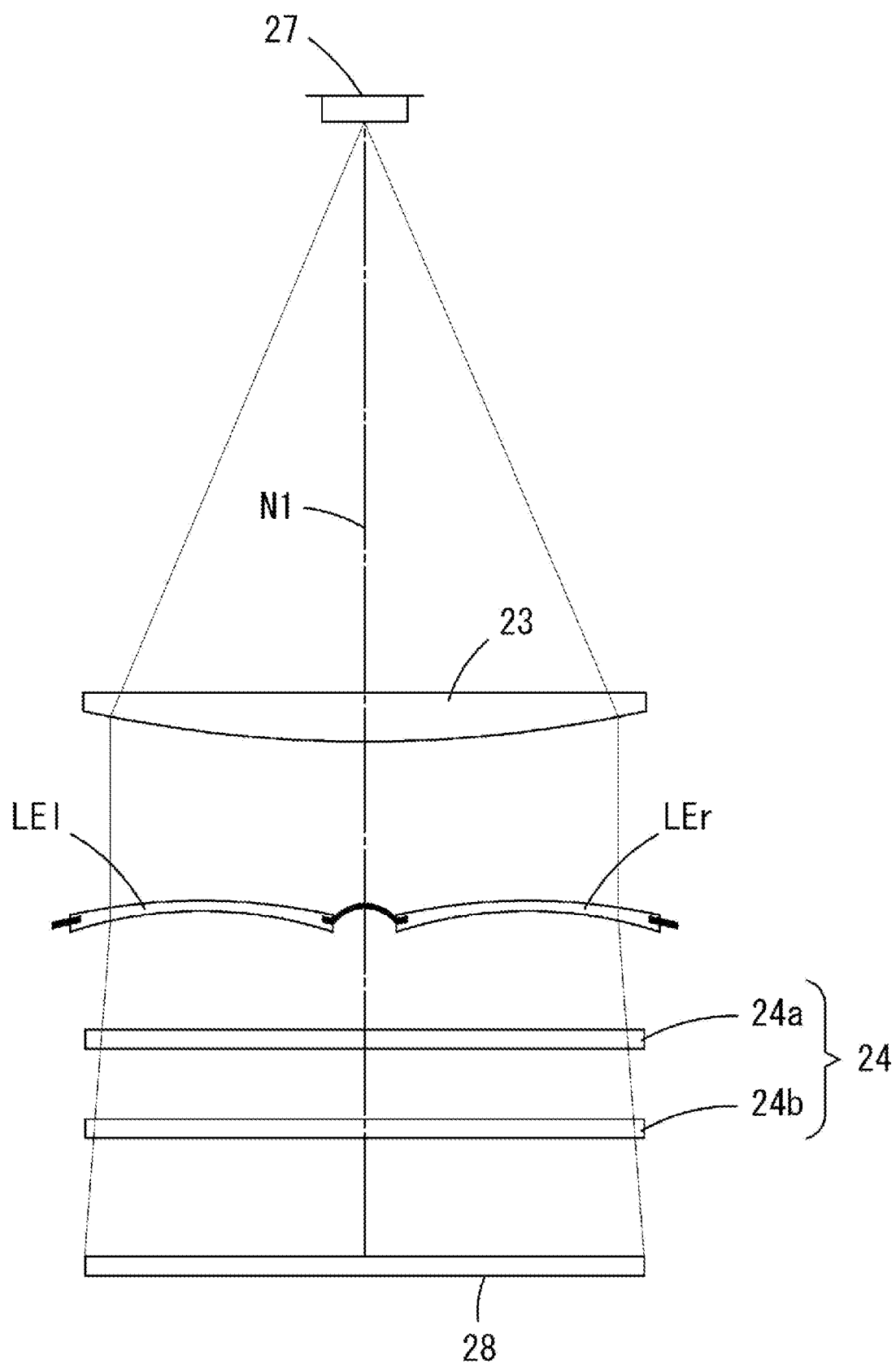
FIG. 12 is an example of a configuration in which a display is used as a light source.

FIG. 12 is an example of a configuration in which the display 28 is used as the light source. For example, in a case where the display 28 is used as the light source, the light source 2821, the first transmissive display 24a, and the second transmissive display 24b may be disposed on the rear surface side of the lens LE, and the imaging element 27 may be disposed on the front surface side of the lens LE. The measurement light flux applied from the display 28 is imaged by the imaging element 27 after passing through the two transmissive displays and the lens LE.

Figure 13A:
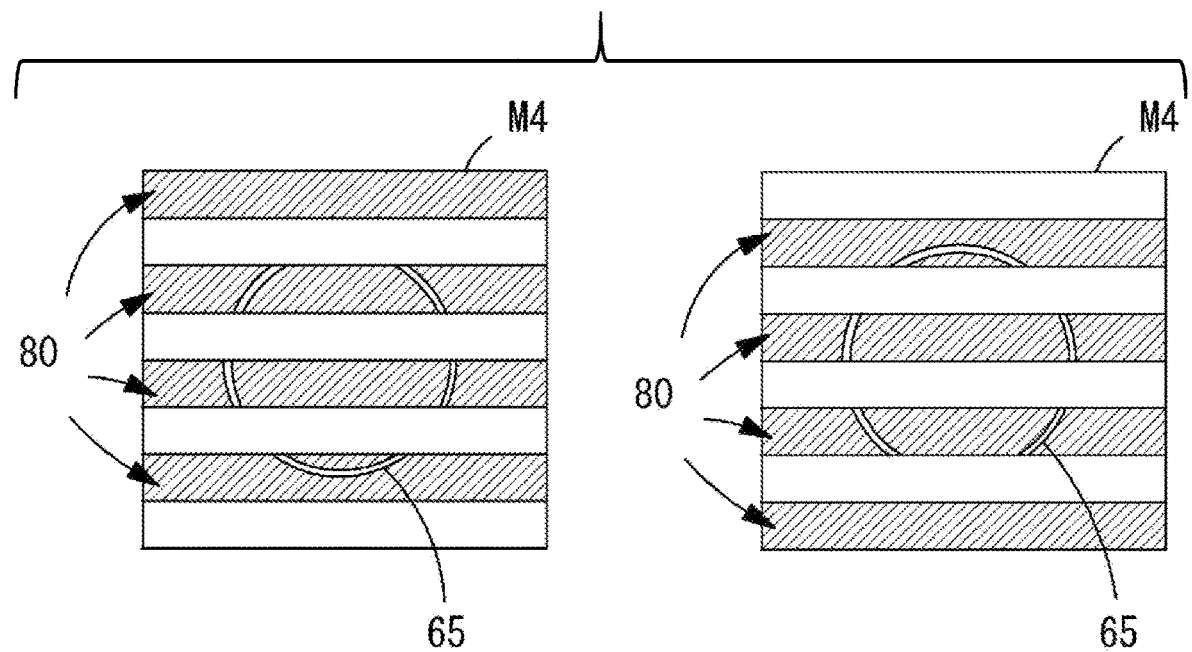
FIG. 13A is a measurement image in a case where a position of an irradiation pattern displayed on a display is moved.
Figure 13B:
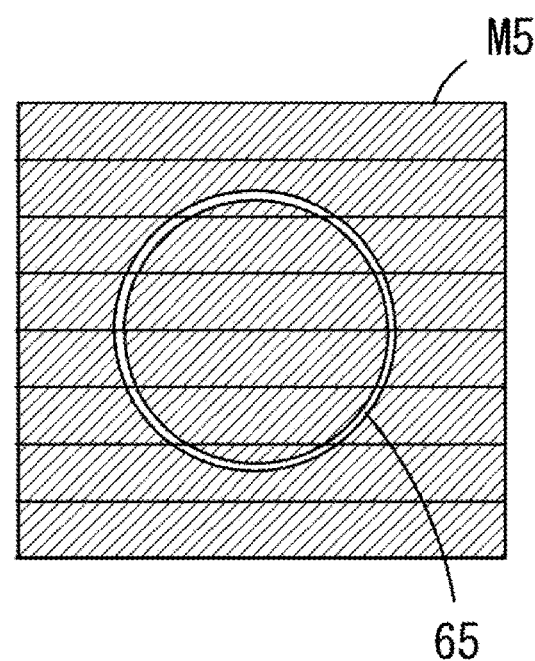
FIG. 13B is a processed image obtained by processing a plurality of captured images.

FIGS. 13A and 13B are examples of the irradiation pattern 80 that can be displayed on the display 28. FIG. 13A is a measurement image M4 in a case where the position of the irradiation pattern 80 displayed on the display 28 is moved. FIG. 13B is a processed image M5 obtained by processing a plurality of captured images. The irradiation pattern 80 may be any irradiation pattern having different brightness and darkness. In FIGS. 13A and 13B, the stripe-shaped irradiation pattern 80 is taken as an example, but it may be a grid-shaped irradiation pattern or the like.

For example, the controller 70 causes the display 28 to display the irradiation pattern 80, and not display the first transmissive display 24a and the second transmissive display 24b. Therefore, the measurement light flux emitted from the display 28 passes by the two transmissive displays, is refracted by the lens LE, and reaches the imaging element 27. The controller 70 processes an electric signal based on the imaging result of the imaging element 27 and acquires the measurement image M4. For example, the measurement light flux emitted from the display 28 is scattered by the hidden mark (or a scratch on the lens LE, or the like) formed on the lens LE, and is not imaged by the imaging element 27. Therefore, in the measurement image M4, the hidden mark image 50 is partially observed in the portion where the irradiation pattern 80 and the hidden mark image 50 overlap. For example, the controller 70 may control the display of the display 28, move the irradiation pattern 80 by a predetermined pixel position, and acquire a plurality of measurement images M4. Further, for example, the controller 70 may analyze each of the plurality of measurement images M4 to acquire the processed image M5 and detect the entire shape of the hidden mark image 65. Of course, instead of acquiring the plurality of measurement images M4, one measurement image M4 may be acquired and analyzed to detect the entire shape of the hidden mark image 65.

In a case where the display 28 is used as the light source, the lens LE can be illuminated without projecting the irradiation pattern onto the lens LE, by turning on the display 28 and not displaying the irradiation pattern 80. In this state, the display and non-display of the first index pattern 30a on the first transmissive display 24a, and the display and non-display of the second index pattern 30b on the second transmissive display 24b are controlled, and the optical characteristic of the lens LE may be obtained based on each measurement image. The second transmissive display 24b (display 28) may be provided to be movable in the optical axis N1 direction, and the calculation of the optical characteristic of the lens LE and the detection of the hidden mark image 65 may be adjusted.

Further, in a case where the display 28 is used as the light source, the display 28 may also serve as the second transmissive display 24b. That is, the first index pattern 30a may be displayed on the first transmissive display 24a, and the measurement image M1 including the first index pattern image 41 may be acquired, and then the second index pattern 30b may be displayed on the display 28, and the measurement image M2 including the second index pattern image 51 may be acquired. The optical characteristic of the lens LE can be obtained as described above.

For example, by using the display 28 as the light source, the lens image and the index pattern image (index image) projected onto the lens LE can be obtained in a state of high contrast, and the detection accuracy of these images can be improved. In the configuration in which the lens LE is illuminated by the retroreflective member 25, it is necessary to branch the optical path of the measurement light flux emitted from the light source 21 to guide the light to the imaging element 27, and the amount of light is reduced. However, for example, in a case where the lens LE is illuminated by the display 28, the measurement optical path emitted from the display 28 can be guided to the imaging element 27 without being branched, and thus, the decrease in the amount of light can be reduced and the detection accuracy of these images can be further improved.

In the present example, a configuration is described as an example, in which, in the first transmissive display 24a and the second transmissive display 24b, the index pattern is displayed so that the measurement light flux from the light source 21 is shielded by the index 31 and transmits through a region other than the index 31, but the present invention is not limited to this. For example, a configuration may be provided in which the index pattern is displayed so that the measurement light flux from the light source 21 transmits through the index 31 and shields the region other than the index 31. In this case, dust adhering to the lens LE or the transmissive display, reflection unevenness due to the retroreflective member 25, and the like are reduced from being reflected in the index pattern, and thus, the pixel position of the index image can be detected more accurately.

In the present example, the transmissive display having the polarization characteristic may be used. In this case, the transmissive display may be disposed so that the polarization direction in the lens LE is the Y direction in the measurement device 1. For example, since polarized sunglasses allow only polarized light in the up-down direction of the lens (Y direction in the measurement device 1) to pass through, by setting the transmissive display in this way, even in a case where measuring the optical characteristic of the polarized sunglasses, the polarized measurement light flux obtained by transmitting through the transmissive display can efficiently pass through.

In the present example, a configuration is described as an example, in which the interval of the index 31 in the first transmissive display 24a is changed based on the distance K1 of the interval of the first index image in the measurement image M1, but the present invention is not limited to this. In the present example, a configuration may be provided in which the interval of the index 31 in the first transmissive display 24a is changed based on the shape of the first index image in the measurement image M1. For example, the controller 70 may detect the edge from the rising and falling of the luminance in the measurement image M1 to detect the shape of the first index image.

For example, as the lens LE is the minus lens and has the high power, the first index image is reduced by the refraction power of the lens LE, so that the number of pixels used by the imaging element 27 to express each first index image is small. Therefore, the first index image in the measurement image M1 becomes coarse and the first index image is deformed. Therefore, a configuration in which the controller 70 uses the shape of the first index image in the measurement image M1 to determine whether to change the interval of the index 31, and the interval of the index 31 is changed in a case where the controller 70 detects that the first index image is deformed may be provided.

In the present example, a configuration is described as an example, in which the interval of the index 31 in the first transmissive display 24a is changed based on the detection result of the first index image in the measurement image M1 (that is, the interval of the first index image or the shape of the first index image), but the present invention is not limited to this. In the present example, a configuration may be provided in which the interval of the index 31 in the first transmissive display 24a is changed based on the optical characteristic of the lens LE. In this case, the controller 70 may first acquire the measurement image M1 regardless of the interval or the shape of the first index image in the measurement image M1, and may acquire the measurement image M2 regardless of the interval or the shape of the second index image in the measurement image M2. The controller 70 acquires the optical characteristic of the lens LE based on the measurement image M1 and the measurement image M2. As an example, the refraction degree of the lens LE is acquired.

Here, the controller 70 determines whether the refraction degree of the lens LE exceeds the refraction degree set as a predetermined threshold value in advance. For example, the controller 70 may determine that the refraction degree of the lens LE is less than the predetermined threshold value in a case where the refraction degree of the lens LE is smaller than the predetermined threshold value. Further, for example, the controller 70 may determine that the refraction degree of the lens LE exceeds the predetermined threshold value in a case where the refraction degree of the lens LE is larger than the predetermined threshold value. For example, in a case where the controller 70 determines that the refraction degree of the lens LE exceeds the predetermined threshold value, the controller 70 may change the interval of the index 31 in the first transmissive display 24a and the second transmissive display 24b, and acquire the measurement image M1 and the measurement image M2 again to acquire the optical characteristic of the lens LE.

For example, as described above, the eyeglasses lens measurement device in the present example may calculate the refraction degree of the eyeglasses lens and set the interval of the plurality of indexes forming the index pattern based on the calculation result of the refraction degree. This makes it possible to appropriately set the interval of the index according to the refraction degree of the eyeglasses lens. Further, therefore, an appropriate index pattern image corresponding to the eyeglasses lens can be acquired, and the optical characteristic of the eyeglasses lens can be accurately acquired.

Further, in the present example, a configuration may be provided in which the interval of the index 31 in the first transmissive display 24a is changed, based on the type of the lens LE. In this case, the controller 70 acquires the measurement image M1 regardless of the interval and the shape of the first index image in the measurement image M1. For example, the controller 70 compares the reference image B1 with the measurement image M1 and determines the type of the lens LE based on the change of the first index image in the measurement image M1 with respect to the index image in the reference image B1. As an example, the controller 70 may determine that the lens LE is the minus lens in a case where the first index image in the measurement image M1 is reduced with respect to the index image in the reference image B1. Further, as an example, the controller 70 may determine that the lens LE is the plus lens in a case where the first index image in the measurement image M1 is enlarged with respect to the index image in the reference image B1.

For example, in a case where the controller 70 determines that the lens LE is the minus lens, the controller 70 may change the interval of the index 31 in the first transmissive display 24a and the second transmissive display 24b. For example, the interval of the indexes 31 in the first transmissive display 24a and the second transmissive display 24b may be changed widely. Therefore, the measurement image M1 and the measurement image M2 may be acquired, and the optical characteristic of the lens LE may be acquired. Further, for example, in a case where the controller 70 determines that the lens LE is the plus lens, the controller 70 may change the interval of the index 31 in the first transmissive display 24a and the second transmissive display 24b. For example, the interval of the index 31 in the first transmissive display 24a and the second transmissive display 24b may be changed narrowly. Therefore, the measurement image M1 and the measurement image M2 may be acquired, and the optical characteristic of the lens LE may be acquired.

For example, as described above, the eyeglasses lens measurement device in the present example may determine whether the eyeglasses lens is the minus lens or the plus lens, and set the interval of the plurality of indexes forming the index pattern based on the determination result. This makes it possible to appropriately set the interval of the index according to the type of the eyeglasses lens. Further, therefore, an appropriate index pattern image corresponding to the eyeglasses lens can be acquired, and the optical characteristic of the eyeglasses lens can be accurately acquired.

In the present example, a configuration is described as an example, in which a predetermined threshold value for changing the interval of the index 31 in the first transmissive display 24a is provided and the interval of the index 31 is changed in a case where the predetermined threshold value is exceeded, but the present invention is not limited to this. For example, in the present example, the interval of the index 31 may be changed by using a table or the like in which the imaging result detected by the imaging element and the interval of the index 31 displayed on the first transmissive display 24a are associated with each other. That is, the interval of the index 31 may be changed according to the detection result detected by the imaging element. For example, the table may be preset, in advance, based on the results of experiments and simulations or the like.

In the present example, a configuration is described as an example, in which, in a case where the lens LE is the minus lens, the normal mode and the wide interval mode are switched based on the distance K1 of the interval of the first index image, but the present invention is not limited to this. For example, in the present example, a configuration may be provided in which, in a case where the lens LE is the plus lens, the normal mode and the narrow interval mode are switched based on the distance K1 of the interval of the first index image. For example, in the narrow interval mode, a voltage may be applied to every third segment displaying the plurality of indexes 31, and the first index pattern 30a in which the interval of the plurality of indexes 31 is shorter than the predetermined distance S1 may be displayed on the first transmissive display 24a. Of course, in the present example, the normal mode, the wide interval mode, and the narrow interval mode may be provided, and any of these modes may be switched and applied based on the distance K1 of the interval of the first index image.

REFERENCE SIGNS LIST

1 eyeglasses lens measurement device
10 eyeglasses support unit
20 measurement optical system
21 light source
24 transmissive display
26 retroreflective member
27 imaging element 70 controller
75 memory

The invention claimed is:

1. An eyeglasses lens measurement device that measures an eyeglasses lens of eyeglasses, the eyeglasses lens measurement device comprising:
 a light source that emits a measurement light flux toward the eyeglasses lens;
 a transmissive display that transmits the measurement light flux from the light source, and displays an index pattern formed by arranging a plurality of indexes;
 a detector that detects the measurement light flux passing through the eyeglasses lens and the transmissive display; and
 a controller configured to:
  control a display of the index pattern; acquire an optical characteristic of the eyeglasses lens, based on a detection result of the detector; and
  acquire lens information different from the optical characteristic of the eyeglasses lens, based on a detection result of the detector,
 wherein the controller causes the transmissive display to display the index pattern to acquire the optical characteristic, and the controller causes the transmissive display not to display at least a part of the index pattern to acquire the lens information,
 wherein the transmissive display includes a first transmissive display arranged to display a first index pattern, and a second transmissive display arranged to display a second index pattern and disposed at a position from the light source different from a position of the first transmissive display from the light source in an optical axis direction,
 the detector detects the measurement light flux that transmits the first transmissive display and further transmits the second transmissive display,
 the controller is further configured to individually control a display of the first index pattern and a display of the second index pattern, and
 at least a part of the second index pattern is not displayed in a case where the first index pattern is displayed, and the second index pattern is displayed in a case where at least a part of the first index pattern is not displayed.

2. The eyeglasses lens measurement device according to claim 1,
 wherein the transmissive display serves as both a left lens transmissive display that displays the index pattern to project an index pattern image onto a left lens of the eyeglasses, and a right lens transmissive display that displays the index pattern to project an index pattern image onto a right lens of the eyeglasses.

3. The eyeglasses lens measurement device according to claim 1,
 wherein the light source is a display that emits the measurement light flux toward the eyeglasses lens to illuminate the eyeglasses lens, and
 the detector detects the measurement light flux from the display.

4. The eyeglasses lens measurement device according to claim 1, comprising:
 a retroreflector arranged to generate a reflected light flux by reflecting the measurement light flux after passing though the eyeglasses lens and the transmissive display back in an incident direction to illuminate the eyeglasses lens and to the detector,
 wherein the detector detects the reflected light flux.

5. The eyeglasses lens measurement device according to claim 1,
 wherein the controller is further configured to switch between a first mode in which the optical characteristic of the eyeglasses lens is acquired by the controller, and a second mode in which the lens information of the eyeglasses lens is acquired by the controller.

6. The eyeglasses lens measurement device according to claim 1,
 wherein the light source emits a measurement light flux toward both a left lens of the eyeglasses and a right lens of the eyeglasses, and
 the detector detects the measurement light flux passing through the left lens of the eyeglasses and the transmissive display, and the measurement light flux passing through the right lens of the eyeglasses and the transmissive display.

7. The eyeglasses lens measurement device according to claim 1,
 wherein the light source is a pair of left and right light sources, and includes a first light source that emits the measurement light flux toward a left lens of the eyeglasses, and a second light source that emits the measurement light flux toward a right lens of the eyeglasses, and
 the detector detects the measurement light flux emitted from the first light source and passing through the left lens and the transmissive display, and the measurement light flux emitted from the second light source and passing through the right lens and the transmissive display.

8. The eyeglasses lens measurement device according to claim 1,
 wherein the detector is a pair of left and right detectors, and includes a first detector that detects the measurement light flux passing through a left lens of the eyeglasses and the transmissive display, and a second detector that detects the measurement light flux passing through a right lens of the eyeglasses and the transmissive display.

9. The eyeglasses lens measurement device according to claim 1,
 wherein the controller is further configured to set an interval of the plurality of indexes, wherein the optical characteristic of the eyeglasses lens is acquired based on the measurement light flux passing through the eyeglasses lens and the transmissive display.

10. The eyeglasses lens measurement device according to claim 9,
 wherein the controller is further configured to set an interval of the plurality of indexes forming the index pattern, based on a detection result of the detector.

11. The eyeglasses lens measurement device according to claim 10, wherein the controller is further configured to:
 detect an index pattern image where the index pattern is projected onto the eyeglasses lens, based on a detection result of the detector; and
 set an interval of the plurality of indexes forming the index pattern, based on a detection result of the index pattern image.

12. The eyeglasses lens measurement device according to claim 10,
 wherein the controller is further configured to:
 calculate a refraction degree of the eyeglasses lens, based on a detection result of the detector; and set an interval of the plurality of indexes forming the index pattern, based on a calculation result of the refraction degree of the eyeglasses lens.

13. The eyeglasses lens measurement device according to claim 10,
wherein the controller is further configured to set an interval of the plurality of indexes forming the index pattern, based on whether a detection result of the detector exceeds a predetermined threshold value.

14. The eyeglasses lens measurement device according to claim 10,
wherein the controller is further configured to:
determine whether the eyeglasses lens is a minus lens or a plus lens, based on a detection result of the detector; and
set an interval of the plurality of indexes forming the index pattern, based on a determination result of whether the eyeglasses lens is a minus lens or a plus lens.

15. The eyeglasses lens measurement device according to claim 9,
wherein the controller is further configured to set a first interval of the plurality of indexes forming the index pattern or a second interval that is different from the first interval of the plurality of indexes.

16. The eyeglasses lens measurement device according to claim 15,
wherein the controller is further configured to:
switch between a first mode in which the first interval of the plurality of indexes is set by the controller, and a second mode in which the second interval of the plurality of indexes is set by the controller; and
cause the transmissive display to display any of a first index pattern formed by the plurality of indexes having the first interval and a second index pattern formed by the plurality of indexes having the second interval, according to a mode switched by the controller.

17. An eyeglasses lens measurement device that measures an optical characteristic of an eyeglasses lens, the eyeglasses lens measurement device comprising:
a display as a light source configured to emit a measurement light flux toward the eyeglasses lens to illuminate the eyeglasses lens and configured to display a first index pattern,
a transmissive display that transmits the measurement light flux from the light source, and displays a second index pattern formed by arranging a plurality of indexes; and
a controller configured to:
control a display of the first index pattern and the second index pattern; and
set an interval of the plurality of indexes,
the transmissive display is a transmissive display different from the display as the light source, and
the optical characteristic of the eyeglasses lens is acquired based on the measurement light flux passing through the eyeglasses lens and the transmissive display, wherein the first index pattern is displayed on the display and the second index pattern is displayed on the transmissive display.

18. A non-transitory computer readable recording medium storing an eyeglasses lens measurement program that is used in an eyeglasses lens measurement device which includes a display as a light source and also configured to display a first index pattern, the display being configured to emits a measurement light flux toward the eyeglasses lens to illuminate the eyeglasses lens, a transmissive display that transmits the measurement light flux from the light source and is capable of displaying a second index pattern formed by arranging a plurality of indexes, and measures an optical characteristic of an eyeglasses lens, the transmissive display being different from the display, the eyeglasses lens measurement program being executed by a processor of the eyeglasses lens measurement device to cause the eyeglasses lens measurement device to execute:
a display control step of causing the display to display the first index pattern and the transmissive display to display the second index pattern; and
an interval setting step of setting an interval of the plurality of indexes.

* * * * *